United States Patent [19]

Toriyama et al.

[11] 4,372,871
[45] Feb. 8, 1983

[54] NEMATIC LIQUID CRYSTALS FOR DISPLAY DEVICES

[75] Inventors: Kazuhisa Toriyama; Tamihito Nakagomi, both of Mobara; Hisato Sato, Tokyo; Yutaka Fujita, Yokohama; Katsuhiko Morita, Urawa; Yoshi Arai, Oyama, all of Japan

[73] Assignees: Dainippon Ink and Chemicals, Inc.; Hitachi Ltd., both of Tokyo, Japan

[21] Appl. No.: 204,292

[22] Filed: Nov. 5, 1980

Related U.S. Application Data

[62] Division of Ser. No. 968,675, Dec. 12, 1978, abandoned.

[30] Foreign Application Priority Data

Dec. 16, 1977 [JP] Japan ................. 52/150513

[51] Int. Cl.$^3$ ............. C09K 3/34; G02F 1/13
[52] U.S. Cl. ............. 252/299.61; 252/299.5; 252/299.63; 252/299.65; 252/299.66; 252/299.67; 350/350 R; 350/332; 350/333
[58] Field of Search ......... 252/299.61, 299.5, 299.63, 252/299.65, 299.66, 299.67; 350/350 R, 332, 333

[56] References Cited

U.S. PATENT DOCUMENTS

| | | | |
|---|---|---|---|
| 3,923,857 | 12/1975 | Boller et al. | 252/299.67 |
| 3,947,375 | 3/1976 | Gray | 252/299.66 |
| 3,975,286 | 8/1976 | Oh | 252/299.67 |
| 3,984,344 | 10/1976 | Cole, Jr. | 252/299.67 |
| 3,997,536 | 12/1976 | Boller et al. | 252/299.61 |
| 4,011,173 | 3/1977 | Steinstrasser | 252/299.5 |
| 4,013,582 | 3/1977 | Cavrilovic | 252/299.65 |
| 4,017,416 | 4/1977 | Inukai et al. | 252/299.65 |
| 4,020,002 | 4/1977 | Oh | 252/299.67 |
| 4,053,431 | 10/1977 | Scherrer et al. | 252/299.66 |
| 4,083,797 | 4/1978 | Oh | 252/299.67 |
| 4,096,086 | 6/1978 | Kanbe | 252/299.67 |
| 4,113,647 | 9/1978 | Coates et al. | 252/299.63 |
| 4,129,983 | 12/1978 | Yamazaki | 252/299.67 |
| 4,130,502 | 12/1978 | Eidenschink et al. | 252/299.63 |
| 4,137,192 | 1/1979 | Matsufuji | 252/299.66 |
| 4,137,250 | 1/1979 | Reynolds | 252/299.67 |
| 4,147,651 | 4/1979 | Oh | 252/299.66 |
| 4,149,413 | 4/1979 | Gray et al. | 252/299.66 |
| 4,154,697 | 5/1979 | Eidenschink et al. | 252/299.63 |
| 4,293,434 | 10/1981 | Deutscher et al. | 252/299.63 |

FOREIGN PATENT DOCUMENTS

| | | | |
|---|---|---|---|
| 2701591 | 7/1978 | Fed. Rep. of Germany | 252/299.63 |
| 2752975 | 8/1978 | Fed. Rep. of Germany | 252/299.63 |
| 2846409 | 6/1979 | Fed. Rep. of Germany | 252/299.61 |
| 105701 | 5/1974 | German Democratic Rep. | 252/299.63 |
| 132591 | 10/1978 | German Democratic Rep. | 252/299.63 |
| 54-6884 | 1/1979 | Japan | 252/299.63 |
| 54-101784 | 8/1979 | Japan | 252/299.63 |
| 54-118389 | 9/1979 | Japan | 252/299.63 |
| 54-148184 | 11/1979 | Japan | 252/299.63 |
| 54-152684 | 12/1979 | Japan | 252/299.63 |
| 55-3451 | 1/1980 | Japan | 252/299.63 |
| 55-9665 | 1/1980 | Japan | 252/299.63 |
| 55-21418 | 2/1980 | Japan | 252/299.63 |
| 2017742 | 10/1979 | United Kingdom | 252/299.63 |
| 2028363 | 3/1980 | United Kingdom | 252/299.63 |

OTHER PUBLICATIONS

Abst. 6th Intern'l. Liq. Cryst. Conf., I-3 & I-4, Kent, Ohio (Aug. 23-27, 1976).
Demus, D., Nonemissive Electrooptic Displays, Kmetz, R. A. et al., Plenum Press, N.Y.-London, pp. 83-117 (1976).
Deutscher, H. J., et al., Z. Chem., vol. 17, p. 64 (1977).
Eidenschink, R., et al., SID 77 Digest, pp. 66-67 (1977).

*Primary Examiner*—Teddy S. Gron
*Attorney, Agent, or Firm*—Sherman & Shalloway

[57] ABSTRACT

A nematic liquid crystal composition composed of (i) at least one compound of the general formula

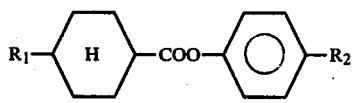

wherein $R_1$ represents n-$C_mH_{2m+1}$, $R_2$ represents n-$C_qH_{2q+1}$-O, and m and q are integers of 1 to 10, (ii) at least one compound selected from the group consisting of nematic liquid crystalline compounds having positive dielectric anisotropy and homologs thereof, and (iii) as an optional ingredient, at least one compound selected from the group consisting of nematic liquid crystalline compounds having negative dielectric anisotropy and homologs thereof. This liquid crystal composition is colorless and chemically stable and has superior multiplexing drive characteristics. These properties render it useful as a display element.

12 Claims, 14 Drawing Figures

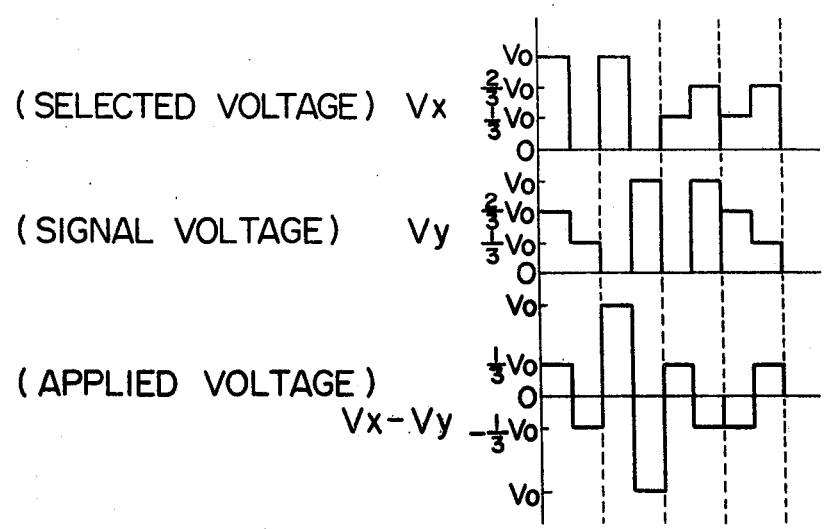
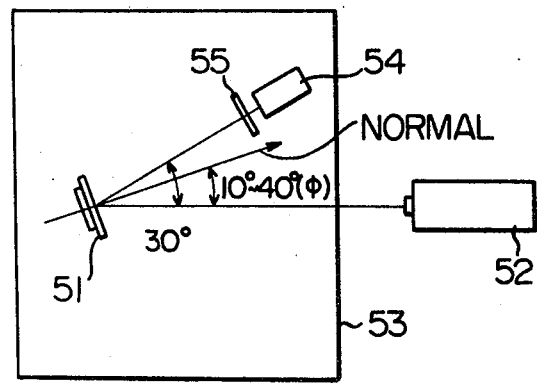

SELECTED POINT (ON)    UNSELECTED POINT (OFF)

SELECTED POINT (ON)    UNSELECTED POINT (OFF)

WEIGHT PERCENT OF $N_p^s$-TYPE SUBSTANCE (d) BASED ON Nn-TYPE MIXED LIQUID CRYSTAL (VII) + $N_p^s$-TYPE SUBSTANCE (d) + $N_p^w$-TYPE SUBSTANCE (e) AND (f)

NEMATIC LIQUID CRYSTALS FOR DISPLAY DEVICES

This is a division of Application Ser. No. 968,675, filed Dec. 12, 1978, now abandoned.

This invention relates to a liquid crystalline composition suitable for use in a field effect mode liquid crystal display device, especially in a device to be operated by a multiplexing drive method.

The attached drawings are given as an aid for specifically describing the present invention.

FIG. 3 is a view showing one example of the waveform of multiplexing drive by optimized amplitude selective multiplexing (in the case of ⅓ bias, ⅓ duty);

FIG. 5 is a view illustrating a device for measuring electro-optical characteristics;

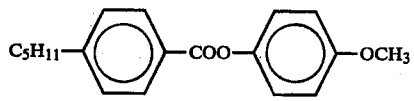

Figure 10:
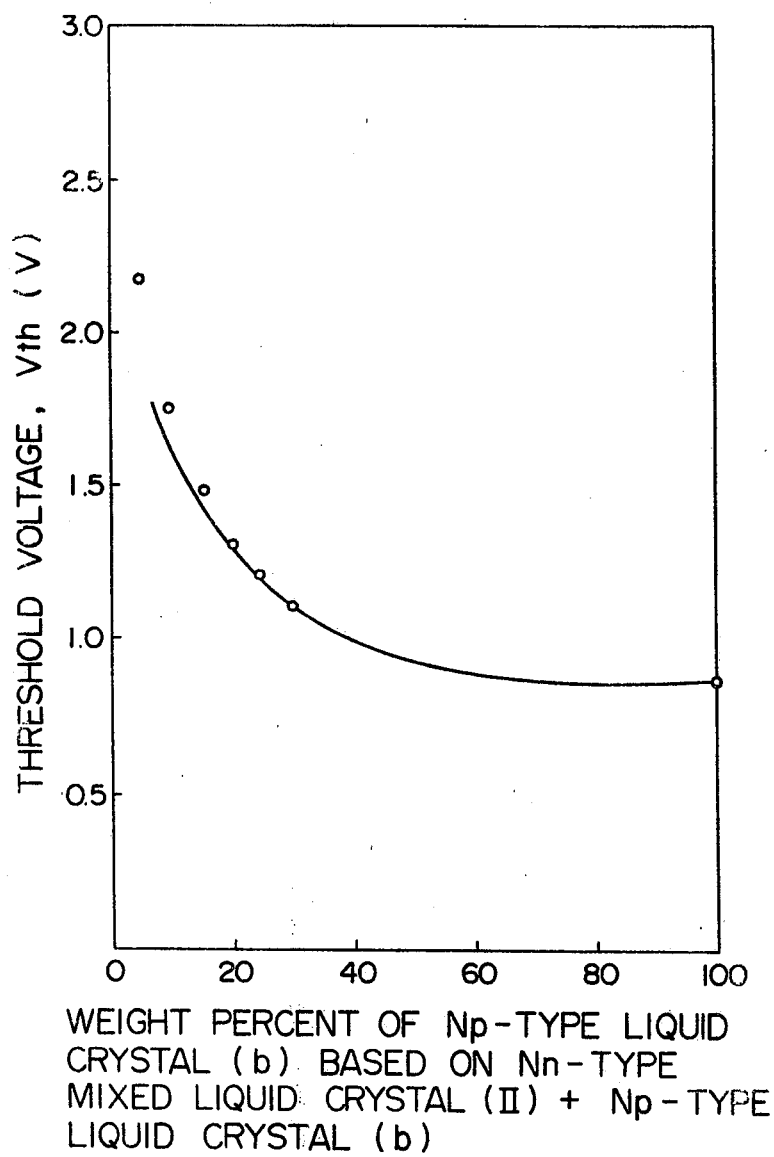

added to a mixture of an Nn-type substance (Schiff's base) and an Np-type substance and the mesomorphic range of the resulting mixture;

FIG. 10 is a graphic representation showing the relationship between the proportion of an Np-type substance in a mixture of it with an Nn-type substance and the threshold voltage of the mixture; and FIGS. 11, 12, 13 and 14 are graphic representations showing the electro-optical characteristics of mixed liquid crystals of the invention comprising an Np-type substance and an Nn-type substance.

Figure 1:
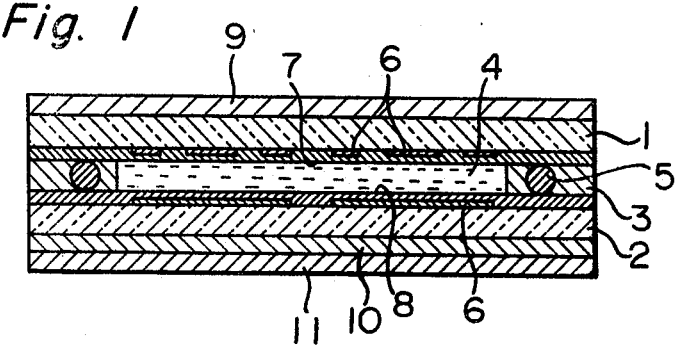
FIG. 1 is a sectional view showing one example of a liquid crystal display device.

Various field effect mode liquid crystal display devices have been known. A twisted nematic type (TN type) liquid crystal display device, a typical example, is shown in FIG. 1 and consists basically of a first substrate 1 and a second substrate 2 each made of transparent glass or the like which are disposed substantially parallel to each other with a predetermined clearance therebetween (for example, 5 to 15 μm) with edge portions being sealed by a sealing material 3 such as frit glass or an organic adhesive, and a nematic liquid crystal 4 enclosed in the internal space thus formed. The predetermined distance can be obtained by a spacer 5 of fiber glass, glass powder, etc. If desired, the sealing material 3 may serve concurrently as the spacer without providing the spacer 5.

An electrode 6 in a predetermined pattern is formed on the opposing inside surfaces of the first and second substrates 1 and 2. The surfaces of these substrates 1 and 2 which make contact with the liquid crystal constitute alignment control surfaces 7 and 8, respectively, which serve to align the liquid crystal molecules near these surfaces in the desired direction. These alignment control surfaces can be formed, for example, by vacuum-depositing SiO on a substrate having an electrode thereon, in a direction oblique to the substrate surface to form an obliquely vacuum-deposited film of SiO, or by bonding a thin film of an organic polymer or an inorganic material to the substrate surface and rubbing the surface of the thin film in a fixed direction with cotton cloth or the like.

Figure 2:
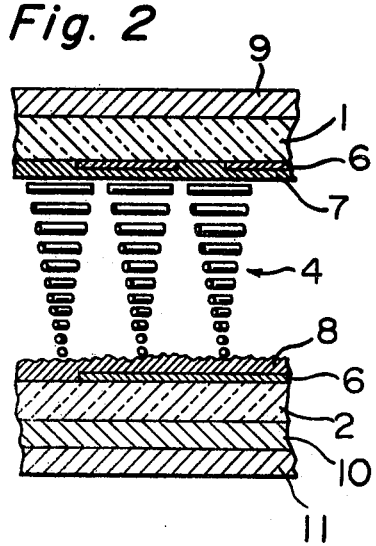
FIG. 2 is a view showing the aligned state of liquid crystalline molecules.

By selecting a first fixed direction for the liquid crystal alignment control surface 7 of the first substrate 1 and a second fixed direction for the alignment control surface 8 of the second substrate 2, and making the two directions different from each other, the molecules of the nematic liquid crystal 4 interposed between the substrates 1 and 2 are aligned in the state of being twisted from the first direction to the second direction. The twist angle of the liquid crystal molecules formed by the first and second directions may be optional, but generally, an angle of about 90° is chosen as shown in FIG. 2.

A first polarizer 9 and a second polarizer 10 are disposed over the outside surfaces of the first and second substrates 1 and 2, respectively. The angle formed by the polarizing axes of the two polarizers 9 and 10 may usually be the same as the twist angle of the liquid crystal molecules (the angle formed between the first and second directions of alignment), or zero (i.e., the polarizing axes are parallel to each other). Usually, the polarizers are arranged such that the direction of alignment of liquid crystal is parallel or perpendicular to the polarizing axis of the polarizer.

If such a display device performs normal display when viewed from the side of the first substrate, it is widely utilized as a reflective-type display device including a reflector 11 on the back surface of the second polarizer 10, or as a nighttime display device including a light-conducting material such as an acrylic resin plate or glass plate having the desired thickness which is disposed between the second polarizer 10 and the reflector 11 and a light source provided at a suitable part of its side surfaces.

Now, we will describe the theory of display operation of a reflective-type liquid crystal display device having a twist angle of 90° with the angle formed between the crossing polarizing axes being 90°.

When no electric field exists in the liquid crystal layer, the incident light falling on the first polarizer 9 becomes a straight-line polarized light along the polarizing axis of the polarizer 9 when passing through the first polarizer 9. This polarized light then falls upon the liquid crystal layer 4. Since the liquid crystal molecules twist by 90° within the liquid crystal layer 4, the plane of polarization of the above polarized light is rotated through 90° upon its passage through the liquid crystal layer, and the light passes through the second polarizer 10. The light is then reflected by the reflector 11, and passes in the reverse order to the one described above through the second polarizer 10, liquid crystal layer 4 and first polarizer 9 and is thus radiated out of the display device. Accordingly, the observer can view the polarized light which has fallen on the display device and reflected by the reflector.

When in such a display device, a predetermined voltage is applied to a selected electrode 6 to impart an electric field to a predetermined area of the liquid crystal layer, the liquid crystal molecules in that area are aligned along the direction of the field. As a result, the rotating ability of the plane of polarization is lost in this area and the plane of polarization does not rotate. Thus, the light polarized by the first polarizer 9 is shut off by the second polarizer 10. This area, therefore, looks dark to the observer. The desired display can therefore be performed by applying a voltage to a desired, selected electrode.

A liquid crystalline composition to be used in such an FEM liquid crystal display device should, especially desirably, possess the following characteristics.

(1) It should have good adaptability to the alignment control surface.

(2) It can be driven over a wide temperature range.

(3) It should have a good response over a wide temperature range, especially at low temperatures.

As regards the first requirement, it is very important to the construction of the present display device that the molecules of liquid crystal 4 should be controlled so as to be aligned in one direction parallel to the interface of the upper substrate and the lower substrate. This control has previously been performed by forming an obliquely vacuum-deposited film of SiO or performing a rubbing treatment.

As regards the second requirement, the liquid crystalline composition should be liquid crystalline at least at temperatures in the neighborhood of 25° C. In practice, liquid crystals which are liquid crystalline at a temperature within the range of $-10°$ C. to $+60°$ C. or higher are required.

The solid-liquid crystal transition temperature as referred to in the present application is determined and defined on the basis of the measurement described below. A liquid crystalline substance or a mixture composed of multiple liquid crystalline substances frequently exhibits a super-cooling phenomenon. In such a case, it is cooled to a sufficiently low temperature (for example, $-40°$ C.) to crystallize it, and then its transition temperature during temperature rise is measured by a melting point measuring instrument, and defined as the solid-liquid crystalline transition temperature. The second requirement is of utmost significance not only in ordinary static drive but also in multiplexing drive. In recent years, the use of a multiplexing drive system based on optimized amplitude selective multiplexing has been essential in liquid crystal display devices, particularly devices requiring much information, for example pocket electronic calculators or matrix display devices. A portable electronic calculator is desirably driven at low voltages, and low voltage drive systems, such as a 4.5 V drive system by connecting three 1.5 V cells in series or a 3 V drive system by connecting two 1.5 V cells in series, are in widespread use. The low-voltage drive system is characterized by the fact that since cells are connected in series, it does not require a voltage step-up circuit, and in combination with C-MOS IC, the service lives of the cells can be maintained at 500 to 2000 hours.

However, when such a multiplexing drive system is employed, there is, in theory, a restriction in operation which is not encountered in the static drive system. Specifically, in a multiplexing drive display device, crosstalk at each picture element of a half-selected or unselected point should be prevented. This is achieved most generally by optimized amplitude selective multiplexing which is designed to broaden the latitude of operation of equalizing crosstalk voltages and increasing the difference between an unselected or half-selected voltage and a selected voltage. This method will be described below with particular reference to an example in which crosstalk voltage are equalized to one-third (⅓) of the selected voltage, and an alternating current waveform is adopted in the drive.

The drive waveform of this system is shown in FIG. 3. Referring to FIG. 3, in a selected condition, a voltage of $\pm V_o$ is applied to the liquid crystal, and in a half-selected or unselected condition, a voltage of $\pm(\frac{1}{3})V_o$ is applied to the liquid crystal. At this time, the root-mean-square value $v_{s1}$ of the voltage applied to a point at which the liquid crystal is in a selected condition (i.e., the display point) is given by the following equation.

$$v_{s1} = \sqrt{\frac{1}{N}\left(V_o^2 + (N-1)\frac{1}{9}V_o^2\right)} \qquad (1)$$

$$= \frac{1}{3}V_o\sqrt{1 + \frac{8}{N}}$$

wherein N is the number of duties.

On the other hand, the root-mean-square value $v_{s2}$ of the voltage applied to a non-selected point of the liquid crystal is given by the following equation.

$$v_{s2} = \frac{1}{3}V_o \qquad (2)$$

To set the displaying point in a selected condition, $v_{s1} \geq V_{th}$, in which $V_{th}$ is the threshold voltage of the liquid crystal, should hold. On the other hand, to prevent the occurrence of crosstalk at the non-selected point, $v_{s2} \leq V_{th}$ must hold. In other words, the conditions for crosstalk-free display by this drive system are expressed by the following equation.

$$v_{s2} \leq V_{th} \leq v_{s1} \qquad (3)$$

If equations (1) and (2) are substituted for equation (3) and the result is rearranged for $V_o$, the following equation (4) is obtained.

$$3V_{th}\sqrt{\frac{N}{N+8}} \leq V_o \leq 3V_{th} \qquad (4)$$

Figure 8:
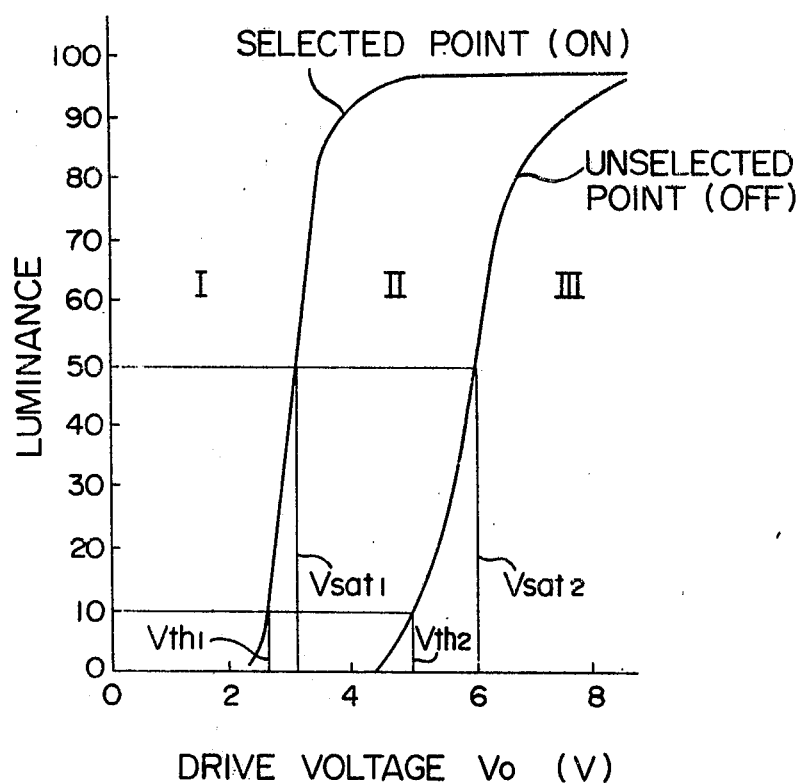
FIG. 8 is a view showing luminance-voltage characteristic curve in multiplexing drive.

When the luminances of selected and non-selected points are measured at varying $V_o$, the relation shown in FIG. 8 is obtained. Thus, as shown, the threshold voltages $V_{th1}$ and $V_{th2}$ in the scale of $V_o$ exist concerning both the selected and non-selected points, and when the following equation holds $$V_{th1} \leq V_o \leq V_{th2} \qquad (5)$$

crosstalk-free display is possible. On the basis of equation (4), $V_{th1}$ and $V_{th2}$ can be given by the following equations.

$$V_{th1} = 3V_{th}\sqrt{\frac{N}{N+8}} \qquad (6)$$

$$V_{th2} = 3V_{th} \qquad (7)$$

In equation (5), the lower limit to the voltages at which display is possible, strictly speaking, is not $V_{th1}$, but should be the saturation voltage $V_{sat1}$ shown in FIG. 8. In other words, the following equation (8) determines the voltage range within which crosstalk-free display is possible.

$$V_{sat1} \leq V_o \leq V_{th2} \tag{8}$$

Devices in which $V_o$ given by equation (8) is in a broader range show a wider drive margin.

Figure 4:
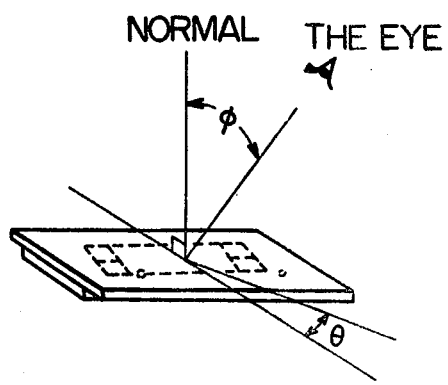
FIG. 4 is a view showing the definition of a viewing angle.

In deriving the above equations, $v_{s1}$, $v_{s2}$, and therefore $V_{th1}$, $V_{th2}$ and $V_{sat1}$ are regarded as constant. In fact, these are variable depending upon temperature (T), the viewing angle ($\phi,\theta$) (FIG. 4), etc. In the above description with reference to equations (1) to (8), the viewing angle ($\phi$) defined in FIG. 4 has been set at 0, but actually, $\phi$ assumes a certain definite value.

Thus, there are various factors which determine the drive margin of display devices, and they are described below one by one. In considering the essence of this problem, it is convenient to take up the following three factors.

(a) Variations in threshold voltage depending upon temperatures.

(b) Variations in threshold voltage depending upon viewing angles.

(c) Sharpness of the voltage-luminance characteristics.

Now, the relation between these factors (a) to (c) and the drive margin will be clarified quantitatively by reference to specific examples of measuring methods.

Figure 6:
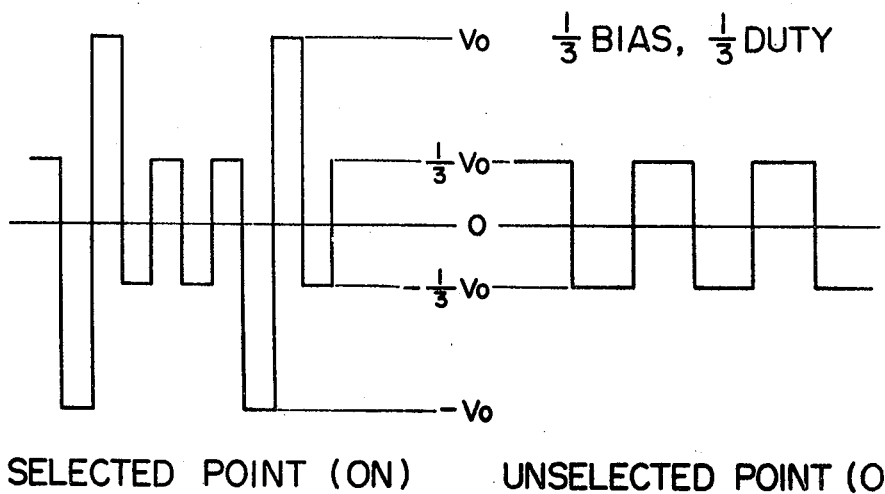
FIG. 6 is a view showing the waveform of a ⅓ bias, ⅓ duty drive.
Figure 7:
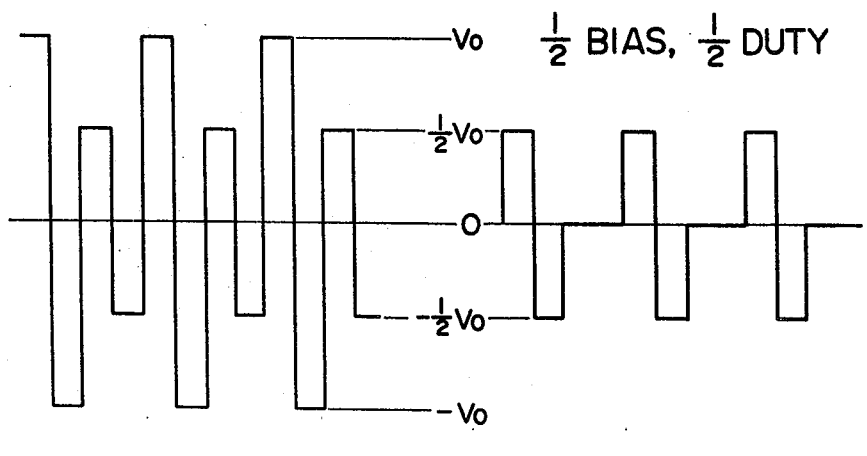
FIG. 7 is a view showing the waveform of a ½ bias, ½ duty drive.

The electro-optical characteristics of a multiplex drive system are measured by the method shown in FIG. 5. A liquid crystal display device 51 is disposed within a constant-temperature bath 53 while it is tilted by an angle of 10° to 40° to a luminance meter 52. The light is irradiated onto the liquid crystal display device 51 through a heat-absorbing glass filter 55 from a tungsten lamp 54 disposed at an angle of 30° to the luminance meter 52. In the case of a ⅓ bias-⅓ duty system and a ½ bias-½ duty system, the measurement is made while setting the drive waveform as shown in FIGS. 6 and 7. Based on this measurement, FIG. 8 shows the relation between drive voltages and luminances. Area I is an area where display does not occur; and area II is an area where display occurs only at selected points. Thus, the desired display of figures, letters, and other patterns is possible in area II. In area III, on the other hand, display occurs at all segments. Thus, area III does not perform a displaying function because of the occurrence of crosstalks.

$V_{th1}$ is the voltage at a selected (on) point at which the luminance is 10%; $V_{th2}$, the voltage at an unselected (off) point at which the luminance is 10%; $V_{sat1}$, the voltage of a selected point at a luminance of 50%; and $V_{sat2}$, the voltage of a non-selected point at a luminance of 50%. The drive margin (M) is defined by the following equation.

$$M(\%) = \frac{V_{th2}(T=40, \phi=40°, f=100) - V_{sat1}(T=0, \phi=10°, f=550)}{V_{th2}(T=40, \phi=40°, f=100) + V_{sat1}(T=0, \phi=10°, f=550)} \times 100 \tag{9}$$

where
T is the temperature (°C.) in the range of 0° to 40° C., $\phi$ is the viewing angle (°) in the range of 10° to 40°, and f is the frequency (Hz) in the range of 100 to 550 Hz.

Accordingly, a broad drive margin means a broad area II. A multiplexing drive system should therefore be driven at a voltage of a certain margin.

On further analysis of the drive margin M given by equation (9), it is seen that M is determined by the aforesaid three factors (a), (b) and (c). These factors are quantitatively defined by the following equations.

(a) Temperature characteristic $\Delta T$ of $V_{th}$ $$\Delta T = \frac{V_{th2}(T=0° \text{ C.}) - V_{th2}(T=40° \text{ C.})}{V_{th2}(T=0° \text{ C.}) + V_{th2}(T=40° \text{ C.})} \times 100 \, (\%) \tag{10}$$

where T is in the range of 0° to 40° C.; $\phi$ is 40°; and f is 100 Hz.

(b) Viewing angle dependence $\Delta\phi$ of $V_{th}$ $$\Delta\phi = \frac{V_{th2}(\phi=40°)}{V_{th2}(\phi=10°)} \tag{11}$$

wherein T=40° C., and f=100 Hz.

(c) Sharpness $\gamma$ of the voltage-luminance characteristics $$\gamma = \frac{V_{sat1}}{V_{th1}} \tag{12}$$

In addition to the three factors (a), (b) and (c), the frequency characteristic $\Delta f$ generally exists.

$$\Delta f = \frac{V_{th1}(f=550)}{V_{th1}(f=100)} \tag{13}$$

The $\Delta f$ is defined under the assumption that T=40° C. and $\phi$=40°.

Furthermore, the margin $\alpha$ of the optimized amplitude selective multiplexing will be defined below for the convenience of derivation of an equation for M.

$$\alpha = \frac{V_{th2}}{V_{th1}} \tag{14}$$

If equations (1), (11), (12), (13) and (14) are substituted for equation (9) and the result is simplified, the drive margin M will be given by the following equation.

$$M = \frac{1 - \left(\frac{\gamma}{\Delta\rho}\right) \frac{\Delta f}{\alpha \cdot A}}{1 + \left(\frac{\gamma}{\Delta\rho}\right) \frac{\Delta f}{\alpha \cdot A}} \tag{15}$$

$$\text{wherein } A = \frac{1 - \Delta T}{1 + \Delta T}$$

Generally, $\gamma$, $\Delta\phi$, $\Delta T$, and $\Delta f$ assume the following values:

$\gamma \geq 1$, $\Delta\phi \leq 1$, $\Delta T \geq 0$, $\Delta f \leq 1$.

The drive margin defined hereinabove may vary depending upon the liquid crystal used, and materials capable of giving a broader margin M are suitable for multiplexing drive. As is clearly seen from equation (15), broadening of the drive margin M requires that the temperature characteristic ΔT more approach zero, and the angle dependence Δφ, the voltage-luminance sharpness γ and the frequency characteristic Δf each approach 1. If desired, the effect of the temperature characteristic ΔT could be ignored by introducing a temperature compensation circuit into the display device, and this can lead to the broadening of the drive margin of the device. However, because the provision of such a temperature compensation circuit necessarily increases the cost of the device, it is very desirable in providing popular articles such as pocket electronic calculators at lower costs to use materials which permit a broad drive margin without incorporating an additional component such as a compensation circuit.

To meet the third requirement that the liquid crystalline composition should have a good response over a broad temperature range, especially at low temperatures, a suitable method would be obtained from the following consideration.

The response in a twisted nematic mode during multiplexing drive is given by the following equations.

$$t \text{ rise} \propto \frac{1}{\left(\frac{8}{N}+1\right)} \cdot \frac{\eta \cdot d^2}{K} \quad (16)$$

$$t \text{ fall} \propto d^2 \cdot \eta/K \quad (17)$$

wherein η is the viscosity, K is an elastic constant, and d is the thickness of the liquid crystal layer; and for K, see equation (59) to be given hereinbelow.

It is seen from equations (16) and (17), the response of a liquid crystal is determined primarily by its viscosity. It is generally believed that these theoretical equations agree well with response actually measured. It would be easy therefore for those skilled in the art to see that the response of a liquid crystal can be increased by increasing or decreasing its viscosity.

To meet the third requirement, therefore, it is important to find out liquid crystalline materials having a low viscosity (of course, in addition to meeting the first and second requirements).

Various materials including Schiff's bases, esters, biphenyls and azoxy compounds have previously been suggested for use in liquid crystal display devices, especially multiplexing drive liquid crystal display devices.

Azoxy-type liquid crystals have a good temperature characteristic (i.e., a small ΔT) whereby variations in threshold voltage depending upon temperatures are small. These materials can have a drive margin M (as defined hereinabove) of more than 10% in a ⅓ bias-⅓ duty multiplexing drive system. The azoxy-type liquid crystals are represented by the following general formula.

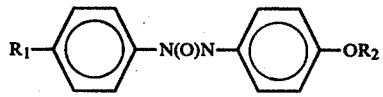

They show weakly negative dielectric anisotropy, and are generally used as a mixture with nematic liquid crystals (Np) having positive dielectric anisotropy. These azoxy-type materials are colored yellow as a result of absorbing part of the visible light, and have a maximum absorption of light at 350 nm. They photochemically react with light of wavelengths near 350 nm in the following manner.

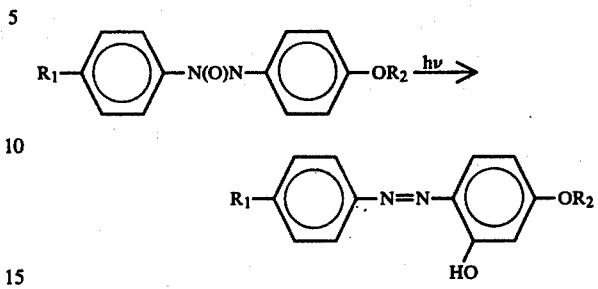

As a result of this photochemical reaction, a substance is formed which is not liquid crystalline. By the formation of this product, the azoxy liquid crystal turns red, and generally has an abruptly reduced electric resistance.

For this reason, a filter for cutting off light of wavelength of 500 nm or less must be attached to a display device in practical application in order to avoid the photodegradation of the azoxy nematic liquid crystals by sunlight or fluorescent lamps. The device, therefore, becomes complicated.

On the other hand, Schiff's bases, biphenyls, and esters have been considered for use as a white liquid crystal display material.

The biphenyl-type liquid crystals are considered to by chemically stable with good resistance to light, water, oxygen, etc. Among them, those having positive dielectric anisotropy include room-temperature liquid crystals which are useful for practical purposes, but those having negative dielectric anisotropy include a very few useful room-temperature liquid crystals. Accordingly, there are a very few liquid crystalline mixtures composed only of biphenyl-type liquid crystals. In addition, such mixed crystals do not have a particularly high positive dielectric anisotropy, and therefore, their threshold voltages are difficult to adjust over a wide range. These biphenyl-type liquid crystals are generally unsuitable for multiplexing drive because their threshold voltages depend greatly on temperatures (ΔT is large).

The ester-type liquid crystals have relatively good chemical stabilty, and include many types of liquid crystalline substances having positive dielectric anisotropy or negative dielectric anisotropy. However, the temperature dependence of their threshold voltages is relatively large, and their viscosities are relatively high. Accordingly, they are difficult of meeting the aforesaid second and third requirements.

The Schiff's base-type liquid crystals have better properties than the ester-type liquid crystals. But since they have a strong tendency to hydrolysis, they sometimes cannot be used unless the display device is constructed to avoid entry of moisture. Thus, these liquid crystals do not prove to the entirely satisfactory.

Now, the prior art regarding multiplexing drive liquid crystalline materials will be briefly reviewed.

Much research and development have been undertaken in the past regarding liquid crystalline materials for twisted nematic (TN) type display elements. These nematic liquid crystalline materials are classified roughly into those composed only of liquid crystal molecules having positive dielectric anisotropy (Np-type liquid crystals) and those composed of liquid crystals having negative dielectric anisotropy (Nn-type liquid crystals) and Np-type liquid crystals. In the case of the former, there are not many types of simple liquid crystals which have positive dielectric anisotropy, and their mesomorphic range (MR) is narrow. Hence, mixed liquid crystals having a broad mesomorphic range are difficult to obtain from the simple liquid crystals. Furthermore, mixed liquid crystals composed of Np-type liquid crystals alone are an assembly of strongly polar molecules, and therefore have a high viscosity. Thus, these mixed crystals generally have the defect of poor response when applied to TN-type display devices.

There has in fact been an example of work undertaken in an attempt to develop liquid crystalline materials suitable for multiplexing drive which are free from the above defect. For example, it was suggested to improve the temperature dependence of the threshold voltage of a biphenyl-type liquid crystal by mixing a biphenyl-type Np liquid crystal having a relatively low viscosity with an Np-type liquid crystal having a broad mesomorphic range such as a compound of the formula

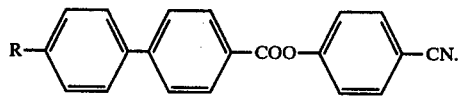

Addition of large quantities of such long molecules causes deleterious effects. For example, the viscosity or the elastic constant of the resulting mixture increases, and may finally cause a rise in threshold voltage. Or the viewing angle characteristic ($\Delta\phi$) of the threshold voltage is aggravated. Accordingly, for the development of multiplexing drive liquid crystalline materials, investigations of mixed liquid crystals composed only of Np-type liquid crystals are not so fruitful.

On the other hand, much work has been done in the past about Nn+Np mixed liquid crystals. A careful review of the past efforts has shown that many of them are simply directed to the discovery of liquid crystalline materials having a broad mesomorphic range or those having a low viscosity. A limited number of research works on Nn+Np type mixed liquid crystals are apparently directed to the imparting or securing of multiplexing drive characteristics. For example, Np+Nn type mixed crystals consisting of azoxy-type liquid crystals as an Nn-type liquid crystal and ester-type liquid crystals such as 4-cyanophenyl-4'-substituted benzoate or biphenyl-type liquid crystals such as 4-cyano-4'-substituted biphenyl as an Np-type liquid crystal have been investigated heretofore. Some of these works have in fact pointed out the importance of the temperature dependence of threshold voltages and the rising characteristics of luminance curves, and a very few have also pointed out the importance of the dependence of threshold voltages on viewing angles. However, there has scarcely been any attempt at quantitatively rating these characteristics, systematically clarifying their relation to the structures and properties of liquid crystalline materials, and determining what types of Nn+Np mixed liquid crystals will show superior multiplexing drive characteristics. No research or invention has ever been made which also takes into consideration the chemical stability of liquid crystals so as to provide multiplexing drive liquid crystalline materials which meet the various requirements relating to display characteristics and also reliability which is important in practical application.

It is an object of this invention therefore to provide a colorless liquid crystalline material having superior chemical stability and multiplexing drive characteristics.

In other words, it is an object of this invention to provide a liquid crystalline material having a high utilitarian value which meets various requirements such as chemical stability, white color, stable molecular alignment over a broad temperature range, a broad drive margin, and a fast response.

The present inventors have made efforts to find out liquid crystalline materials meeting this object by quantitatively measuring and rating the $\Delta T$, $\gamma$ and $\Delta\phi$ characteristics of a wide range of available liquid crystalline materials. These efforts have led to the discovery that some of the liquid crystalline 4'-substituted phenyl esters of 4-n-alkylcyclohexanecarboxylic acids disclosed in the specification of East German Pat. No. 105701 are effective for achieving the object of this invention.

Thus, according to this invention, there is provided an Nn+Np type mixed liquid crystal very effective for multiplexing drive, which comprises a matrix of an Nn-type liquid crystal composed of at least one 4-n-alkoxyphenyltrans(equatorial-equatorial)-4'-n-alkylcyclohexanecarboxylate of the general formula

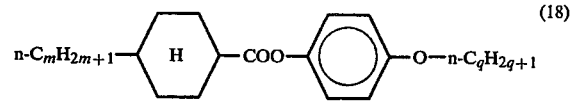

wherein m and q each represent an integer of 1 to 10, and an Np-type liquid crystalline compound and/or its homolog (to be generically referred to as an Np-type substance) and as an optional ingredient, another Nn-type liquid crystalline compound and/or its homolog (to be referred to generically as an Nn-type substance).

The invention will be described in more detail below.

The matrix composed of a liquid crystal of the structure represented by formula (18) above preferably include those compounds of formula (18) in which (m, q) combinations are (3,5), (4,5), (5,5), (6,5), (4,6), (3,1), (3,2), (3,3), (3,4), (3,9), (4,1), (4,2), (4,3), (4,4), (4,8), (5,1), (5,2), (5,3), (5,4), (5,6) and (5,7).

Table 1 summarizes the mesomorphic ranges (MR) of main simple liquid crystals of formula (18).

TABLE 1

| Liquid crystal | $n\text{-}C_mH_{2m+1}$ | $n\text{-}C_qH_{2q+1}$ | MR (°C.) |
|---|---|---|---|
| A | $n\text{-}C_3H_7$ | $n\text{-}C_5H_{11}$ | 37–67 |
| B | $n\text{-}C_4H_9$ | $n\text{-}C_5H_{11}$ | 26–67 |
| C | $n\text{-}C_5H_{11}$ | $n\text{-}C_5H_{11}$ | 31–77 |
| D | $n\text{-}C_6H_{13}$ | $n\text{-}C_5H_{11}$ | 44–52 |
| E | $n\text{-}C_4H_9$ | $n\text{-}C_6H_{13}$ | 25–69 |
| F | $n\text{-}C_3H_7$ | $n\text{-}CH_3$ | 55–64 |
| G | $n\text{-}C_3H_7$ | $n\text{-}C_3H_7$ | 54–65 |
| H | $n\text{-}C_4H_9$ | $n\text{-}CH_3$ | 42–61 |
| I | $n\text{-}C_4H_9$ | $n\text{-}C_2H_5$ | 36–74 |
| J | $n\text{-}C_4H_9$ | $n\text{-}C_6H_{13}$ | 26–70 |
| K | $n\text{-}C_5H_{11}$ | $n\text{-}C_2H_5$ | 56–86 |
| L | $n\text{-}C_5H_{11}$ | $n\text{-}C_4H_9$ | 48–80 |

Mixing of these compounds gives mixed liquid crystals having a broader mesomorphic range as shown in Table 2.

TABLE 2

| Nn-type liquid crystals (the parenthesized figures show weight %) | MR(°C.) | Remarks |
| --- | --- | --- |
| A(50) + C(50) | 13–70 | Designated "mixed liquid crystal (I)" |
| C(50) + E(50) | 17–71 | |
| A(50) + E(50) | 12–65 | |
| A(50) + C(25) + E(25) | 9–69.5 | Designated "mixed liquid crystal (II)" |
| A(33.3) + C(33.3) + E(33.3) | 11–70 | |
| A(33.3) + B(33.3) + C(33.3) | 15–69 | |
| D(50) + K(50) | 13–81 | |
| B(50) + K(50) | 15–78 | |
| B(50) + D(50) | 21–69 | |
| A(50) + K(50) | 21–77 | |
| C(50) + K(50) | 15–81 | Designated "mixed liquid crystal (III)" |

Mixed liquid crystal (I) in Table 2 shows a viscosity of about 35 centipoises at 25° C. In contrast, known ester-type liquid crystals corresponding to a molecular structure resulting from substitution of a benzene ring for the cyclohexane ring of the above liquid crystals show twice as high a viscosity.

For example, a mixture of the following two liquid crystals

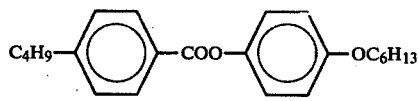

(19)

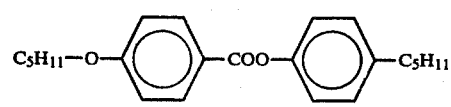

(20)

has a viscosity of about 70 centipoises at 25° C. Generally, the mixed liquid crystals of the invention have a viscosity about one-half of that of ester-type liquid crystals containing two benzene rings in the molecule, and is thus advantageous for high-speed response. It is clear from the above example that an Nn-type liquid crystal composed of at least one liquid crystal of formula (18) meets the third requirement described hereinabove.

In these Nn-type liquid crystals, the difference resulting from subtracting the dielectric constant in a direction at right angles to the director direction ($\epsilon\perp$) from the dielectric constant in the director direction ($\epsilon\parallel$) ($\Delta\epsilon = \epsilon\parallel - \epsilon\perp$) is a negative value, and its absolute value is relatively small. For example, a substance of the formula

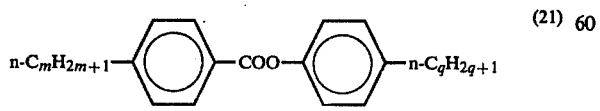

(21)

has a low dielectric constant and its electric polarity is weak. From the concept of organic chemistry, this substance is close to a non-polar solvent. When such a non-polar solvent is mixed with an Np-type substance as a solute having a high dielectric constant and a large anisotropy of dielectric constant such as

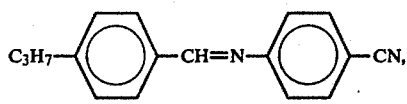

the mutual solubility naturally causes some troubles. For example, a 1:2 (mole) mixture of

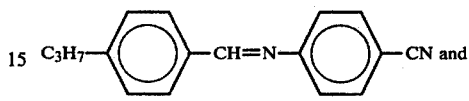

and

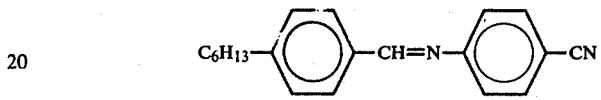

has $\epsilon\parallel$ (1.5 KHz)=25.7 and and $\epsilon\perp$(1.5 KHz)=7.3 when measured at 22° C., the difference $\Delta\epsilon$ being 18.4 (at 1.5 KHz) (the numbers in the parentheses show the frequency at which measurement is made). Since this mixture has a large dielectric constant and its dielectric anisotropy is great, the solute is classified as polar in view of the concept of organic chemistry. If such a solvent and a solute, i.e., a non-polar Nn-type liquid crystal and an Np-type liquid crystal, are mixed without much consideration, it is readily predicted that problems to be described below will arise. The present inventors know from experience that such a fact exists (1) Phase separation may occur when the proportion of the solute (Np-type substance) is increased.

(2) The lower limit of the temperature of the nematic liquid crystal in the mixture rises.

(3) At low temperatures, the alignment of the liquid crystalline molecules is sometimes difficult to control.

Specific examples which will cause these undesirable phenomena are shown below.

A mixture [to be referred to as mixed liquid crystal (IV)] consisting of

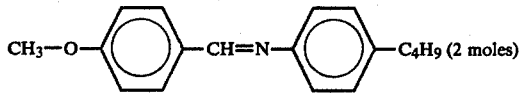

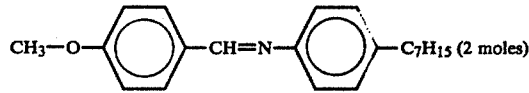

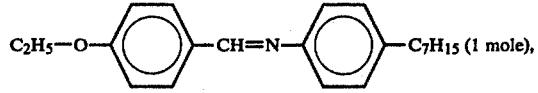

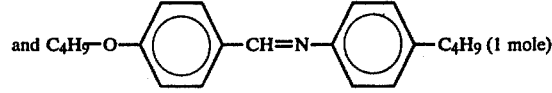

is used as a matrix Nn-type liquid crystal, and the following substance

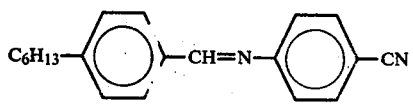  (22)

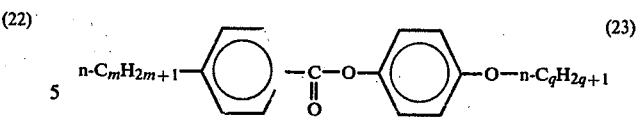  (23)

or

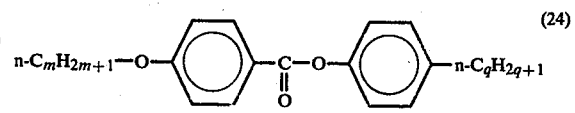  (24)

is used as an Np-type liquid crystal. An obliquely vacuum-deposited SiO film (the angle of incidence 83°) is used as an alignment control film. A liquid crystalline composition containing the substance of formula (22) in varying proportions is enclosed in a twisted nematic liquid crystalline display device having the obliquely vacuum-deposited SiO film. The device is placed in a constant-temperature bath, and the temperature is decreased from room temperature to lower temperatures. It has been found that in some devices, a certain type of disorder in alignment occurs. In a device including upper and lower polarizers and a reflector, the displaying segment has been found to become dark partly or wholly. In other words, the alignment of the liquid crystal molecules changes from a normal twisted state and the light control ability is reduced. The relation between the amount of the Np-type liquid crystal or formula (22) and the disorder in alignment is shown in Table 3. This table shows the highest temperature at which a disorder in alignment of liquid crystals begins to occur. The low temperature stability of the liquid crystalline composition is good in an area where the amount of the Np-type liquid crystal of formula (22) is small. Disorder in alignment tends to occur when the Np-type liquid crystal and the Nn-type liquid crystal are mixed in substantially equal proportions, and tends to be reduced when the amount of the Np-type liquid crystal of formula (22) is small.

TABLE 3

| Amount of the Nn-type liquid crystal (wt. %) | Amount of the Np-type liquid crystal (wt. %) | The highest temperature at which disorder of alignment begins to occur (°C.) |
|---|---|---|
| 95 | 5 | −39 |
| 93 | 7 | −26 |
| 91 | 9 | −18 |
| 80 | 20 | about 0 |
| 50 | 50 | about 0 |

The present inventors have discovered a very general method for preventing such a disorder in alignment and the lack of compatibility, and obtaining a liquid crystalline composition having high reliability. This method will be described below.

The inventors have specifically found that in order to increase compatibility between a non-polar Nn-type liquid crystal and a polar Np-type substance and to obtain a broad mesomorphic range, it is effective to add another Nn-type substance as a third component. In particular, when a nematic liquid crystal having negative dielectric anisotropy and an electric polarity in the molecule, or its homolog is used as the third component, the compatibility of the individual constituents of the mixture can be increased, and the mixture can have a broad mesomorphic range. To take up a more specific example, when the above Np-type liquid crystal of formula (22) is added to a mixture of Schiff's base type liquid crystals (Nn-type liquid crystals) of the type (IV) described hereinabove, an Nn-type substance having a polar group in the molecule, such as those described below, is added further as a third component.

In formulae (23) and (24), m and q represent an integer of 1 to 10.

As a specific example, 13% by weight of an Np-type substance of the formula

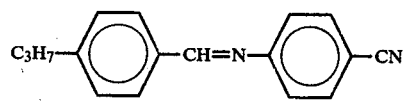

is added to a matrix Nn-type liquid crystal composed of the following six ingredients:

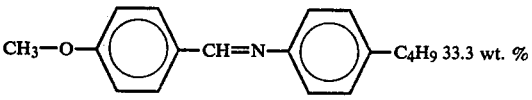 33.3 wt. %

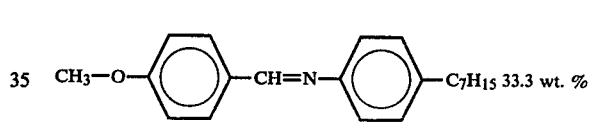 33.3 wt. %

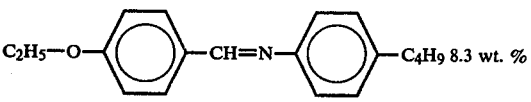 8.3 wt. %

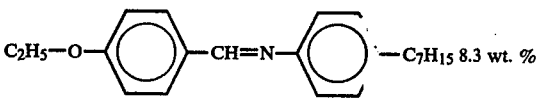 8.3 wt. %

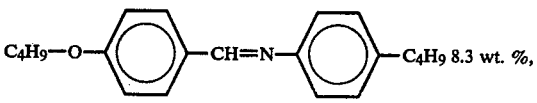 8.3 wt. %, and

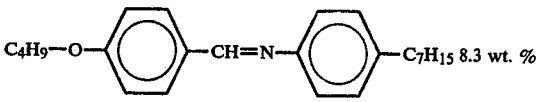 8.3 wt. %

The resulting mixture is abbreviated "mixed liquid crystal (V)". As a polar Nn-type substance, the compound of the formula

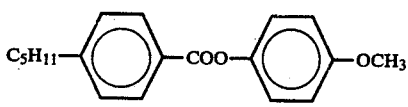

Figure 9:
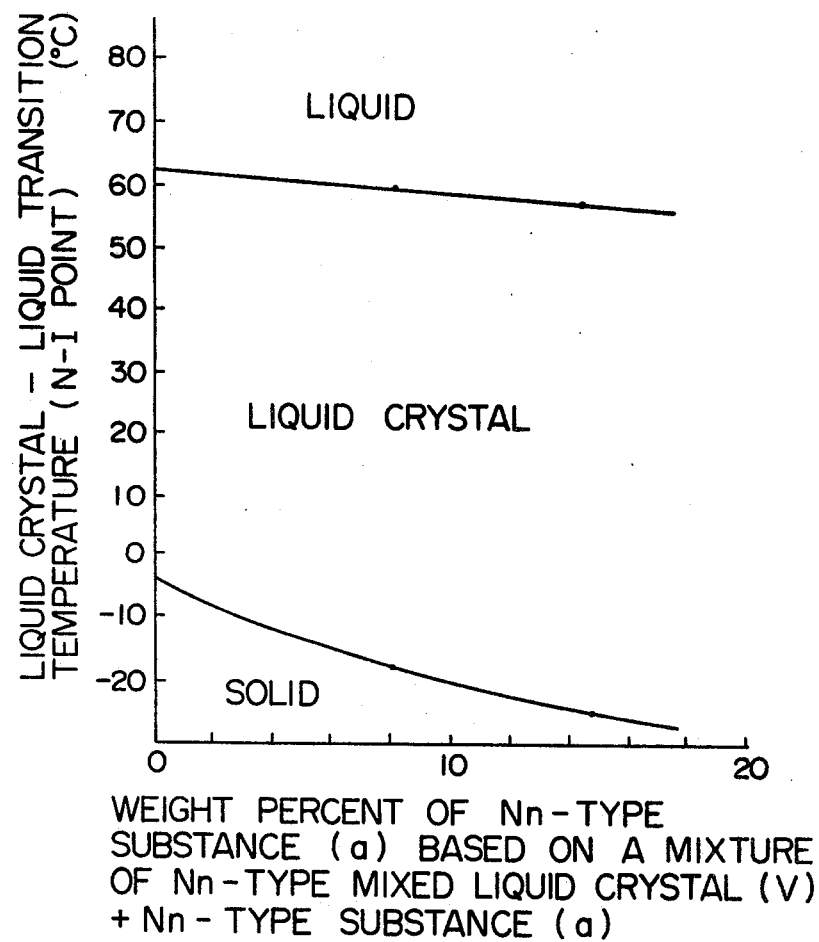
FIG. 9 is a graphic representation showing the relation between the amount of an Nn-type substance

[to be abbreviated "(a)"] is added to the mixed liquid crystal (V). The relation of the amount of the substance (a) to the mesomorphic range is shown in FIG. 9. It is seen from FIG. 9 that the mesomorphic range falls with increasing amount of the substance (a), and a decrease in the liquid crystal-liquid transition temperature (N-I point) is relatively small, and as a whole, the addition of the substance (a) produces a favorable result of broadening the mesomorphic range.

In the foregoing, the effectiveness of a third component in liquid crystalline compositions having a Schiff's base as a matrix Nn-type liquid crystal is shown. It has been found that the same result is obtained when using mixed liquid crystals comprising 4-n-alkoxyphenyl-trans(equatorial-equatorial)-4'-n-alkylcyclohexanecarboxylate of formula (18) such as those shown in Table 2 as an Nn-type matrix liquid crystal. It has specifically been found that when various Np-type substances are added to the above Nn-type matrix liquid crystals, the addition of an Nn-type substance as a third component increases the compatibility between the two components, and can give a broad mesomorphic range.

Examples of Nn-type liquid crystals or homologs thereof preferred as the third component are listed below.

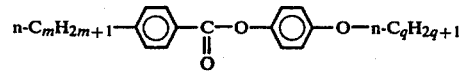 (25)

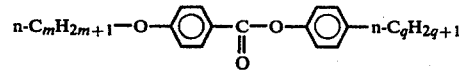 (26)

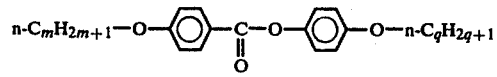 (27)

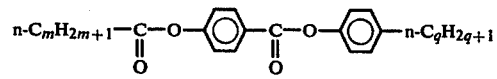 (28)

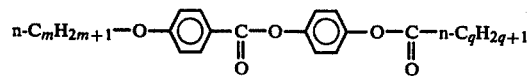 (29)

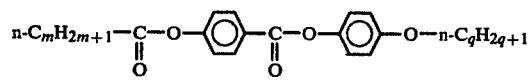 (30)

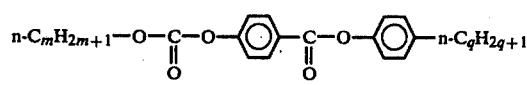 (31)

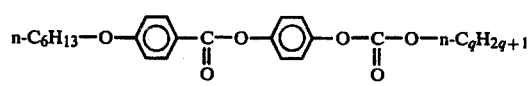 (32)

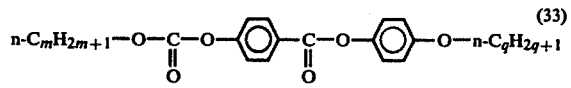 (33)

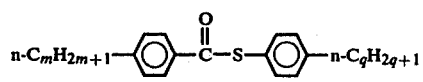 (34)

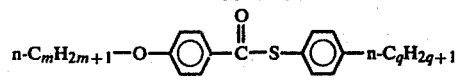 (35)

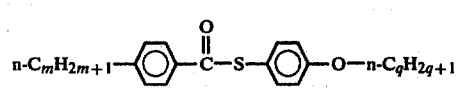 (36)

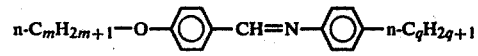 (37)

In formulae (25) to (37), m and q each represent an integer of 1 to 10.

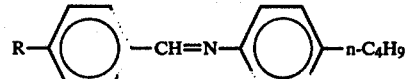 (38)

[wherein R represents $CH_3$—O—$C_2H_4$—O or $CH_3$—O—$(CH_2)_3$—O]

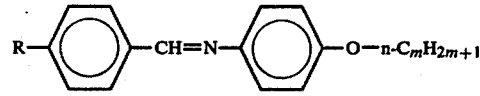 (39)

[wherein m represents an integer of 1 to 9, and R represents $(CH_3)_2$—CH—O, or $(CH_3)_2$—CH—$(CH_2)_2$—O]

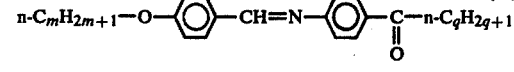 (40)

[wherein m and q each represent an integer of 1 to 10]

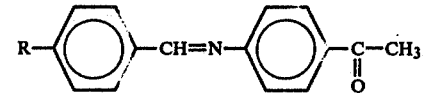 (41)

[wherein R represents $CH_3$—O—$CH_2$—O, $CH_3$—O—$(CH_2)_2$—O, $C_2H_5$—O—$(CH_2)_2$—O, $CH_3$—O—$(CH_2)_3$—O, $C_3H_7$—O—$(CH_2)_2$—O, or $C_2H_5$—O—$(CH_2)_3$—O]

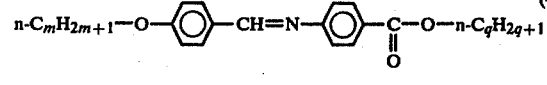 (42)

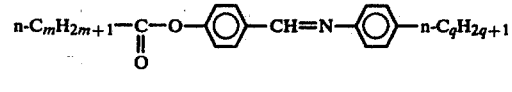 (43)

 (44)

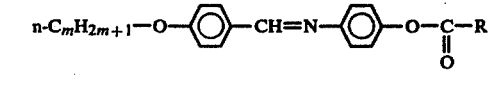 (45)

In formulae (42) to (45), R represents

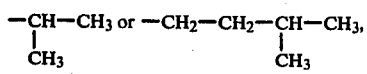

and m and q are integers of 1 to 10.

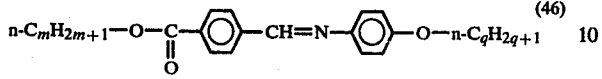
(46)

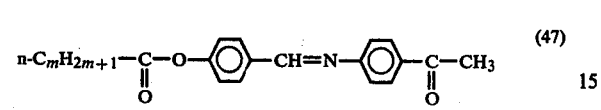
(47)

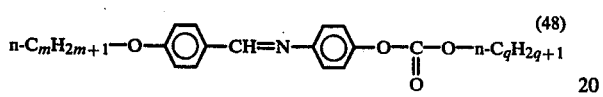
(48)

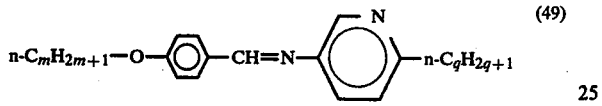
(49)

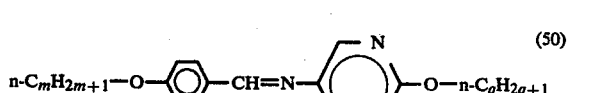
(50)

(51)

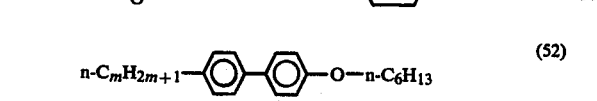
(52)

In formulae (46) to (52), m and q each represent an integer of 1 to 10.

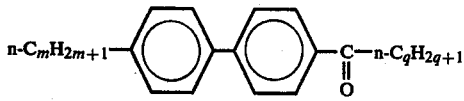
(53)

[wherein m is an integer of 1 to 10, and q is an integer of 1 to 8]

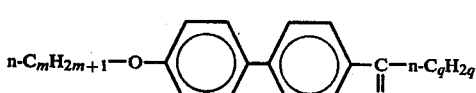
(54)

[wherein m is an integer of 1 to 12, and q is an integer of 1 to 10]

(55)

[wherein m and q each represent an integer of 1 to 10]

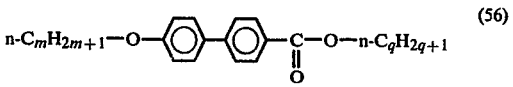
(56)

[wherein m is an integer of 1 to 18, and q is an integer of 1 to 6]

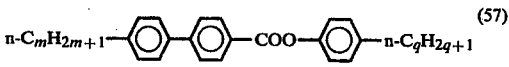
(57)

[wherein m and q each represent an integer of 3 to 8]

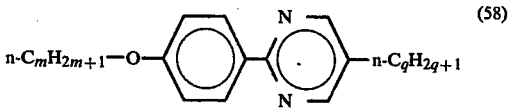
(58)

[wherein m and q are integers of 1 to 10]

In determining the amount of each of the substances of formulae (25) to (58) or a mixture of these in any desired combination as a third component, the following general facts or laws can be the guidelines.

The amount of an Np substance to be mixed with a matrix Nn-type liquid crystal is determined by the threshold voltage required of the resulting mixed liquid crystal. The relation between the amount of the Np substance and the threshold voltage of the mixed liquid crystal is determined substantially on the basis of the following consideration. The amount of an Nn-type substance having a polar group as the third component can be determined correspondingly to the amount of the Np-type substance to be mixed with the matrix substance.

The threshold voltage ($V_{th}$) of a twisted nematic liquid crystal element is given by the following equation.

$$(4\pi)^{-1}(\epsilon_{\parallel} - \epsilon_{\perp})V_{th}^2 = \pi^2 \cdot K_{11} + (K_{33} - 2K_{22})\phi^2 \qquad (59)$$

wherein $\phi$ is the twist angle which is usually $\pi/2$; and $K_{11}$, $K_{22}$ and $K_{33}$ are splay, twist and bend elastic constants, respectively.

Equation (59) can be simplified as follows:

$$V_{th} = 2\pi^{3/2} \cdot \left(\frac{K}{\Delta E}\right)^{\frac{1}{2}} \qquad (59)'$$

wherein $\Delta\epsilon = \epsilon_{\parallel} - \epsilon_{\perp}$ $$K = K_{11} + \tfrac{1}{4}(K_{33} - 2K_{22}) \qquad (59)''$$

In theory, a liquid crystal having any desired $\Delta\epsilon$ can be obtained by mixing liquid crystals having different $\Delta\epsilon$ values. Now, let us suppose that a liquid crystal A having dielectric constants $\epsilon_{\parallel}^A$, $\epsilon_{\perp}^A$ is mixed with a liquid crystal B having dielectric constants $\epsilon_{\parallel}^B$, $\epsilon_{\perp}^B$ in a mixing ratio of $A/B = X/1-X$, and additive property holds good with regard to dielectric constant, then $\Delta\epsilon$ of the mixed liquid crystal is given by the following formula $$\Delta\epsilon = X\Delta\epsilon^A + (1-X)\Delta\epsilon^B = X(\Delta\epsilon^A - \Delta\epsilon^B) + \Delta\epsilon^B \qquad (60)$$

If it is assumed that additive property also holds good with regard to K, the K of the mixed liquid crystal is given by the following equation.

$$K = XK^A + (1-X)K^B = X(K^A - K^B) + K^B \tag{61}$$

When equations (60) and (61) are substituted for equation (59)', the following equation results.

$$V_{th} = 2\pi^{3/2} \cdot \sqrt{X(K^A - K^B) + K^B} / \sqrt{X(\Delta\epsilon^A - \Delta\epsilon^B) + \Delta\epsilon^B} \tag{62}$$

Now, the specific threshold value of a given mixed liquid crystal is computed below by applying specific values to the individual constants in equation (62).

Let us assume that $\Delta\epsilon^B$ of the Nn-type liquid crystal is $-0.3$, and $\Delta\epsilon^A$ of the Np-type liquid crystal

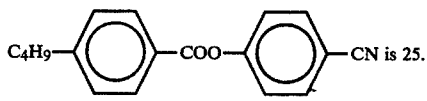

is 25.

Let $K^B = 4 \times 10^{-7}$ dyne and $K_A = 17 \times 10^{-7}$ dyne, then equation (62) will be as follows:

$$V_{th} = 2\pi^{3/2} \cdot \sqrt{(13X + 4)10^{-7}} / \sqrt{25.3X - 0.3} \tag{62}'$$

Those skilled in the art would easily understand that $\Delta\epsilon^A$, $\Delta\epsilon^B$, $K^A$ and $K^B$ values above are not arbitrary, but well reflect the properties of an actual liquid crystal.

FIG. 10 shows the relation of the mixing ratio between the Np-type liquid crystal

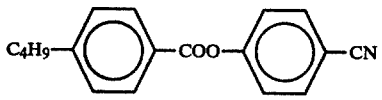

[to be referred to as (b)] and the mixed liquid crystal (II) in Table 2 as an Nn-type liquid crystal to $V_{th}$ (static drive). The experimental result shows good agreement with the theoretical equation (calculating equation) (62) or (62)'.

As described in detail hereinabove, the compatibility of the two types of the liquid crystal described above is not entirely satisfactory, and therefore, it is necessary to add an Nn-type substance, especially a polar Nn-type substance, as a third component. The amount of the third component may be adjusted according to the amount of the Np-type substance. This will be specifically described in Examples to be given hereinbelow.

The inventors have found the following substances as preferred Np-type substances to be added to an Nn-type matrix liquid crystal consisting of at least one 4-n-alkoxyphenyl-trans(equatorial-equatorial)-4'-n-alkylcyclohexanecarboxylate of formula (18).

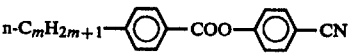
(63)

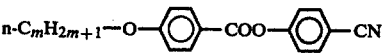
(64)

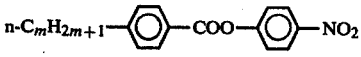
(65)

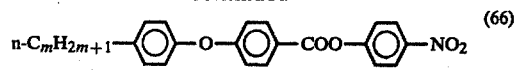
(66)

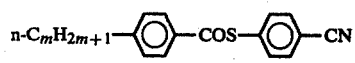
(67)

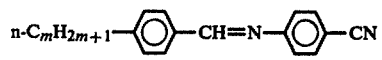
(68)

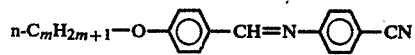
(69)

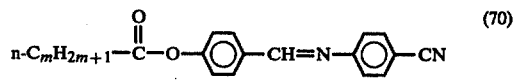
(70)

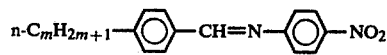
(71)

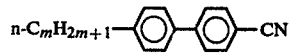
(72)

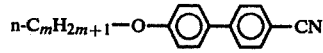
(73)

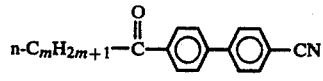
(74)

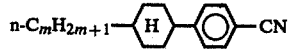
(75)

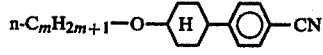
(76)

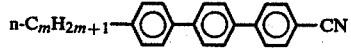
(77)

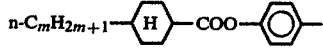
(78)

In formulae (63) to (78), m represents an integer of 1 to 10.

The following substances have been added to the matrix liquid crystal with good results.

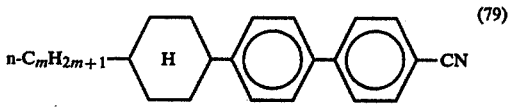
(79)

[wherein m represents an integer of 1 to 8]

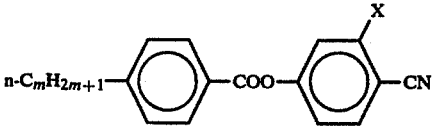
(80)

[wherein m represents an integer of 1 to 8, and X represents F, Br, Cl and I]

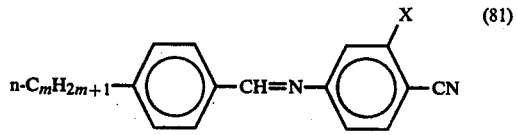

(81)

[wherein m is an integer of 1 to 10, and X represents F, Br, Cl or I]

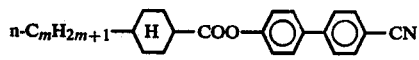

(82)

[wherein m represents an integer of 1 to 10]

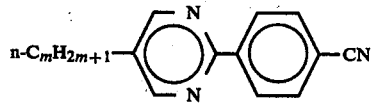

(83)

[wherein m represents an integer of 1 to 10]

It has been found that especially preferred mixed liquid crystals composed of the Nn-type liquid crystal of formula (18) and the Nn-type substance as a third component are those given in Table 4 below.

Examples (Table 5) will show that the mixed liquid crystals in accordance with this invention show especially favorable display characteristics when applied to display devices, especially to multiplexing drive display devices. In Table 5, $t_r$ represents the rising response speed, and $t_f$, the falling response speed.

As already stated in detail, the drive margin is the most necessary condition for performing multiplexing drive. Table 5 shows that the mixed liquid crystals of this invention have a large drive margin. The various factors which determine the drive margin are also shown in Table 5. For comparison, Table 6 shows data for conventional mixed liquid crystals. Tables 5 and 6 also show MR which reflects the compatibility of the constituents of the mixed liquid crystals, and the response of the mixed liquid crystals which is important as a display characteristic.

The drive margin is determined by the temperature dependence ($\Delta T$) of $V_{th}$, the viewing angle dependence ($\Delta \phi$) of $V_{th}$ and the voltage-luminance rising characteristic ($\gamma$) of $V_{th}$. These are determined mainly by a given liquid crystal itself. They are somewhat variable depending upon the interface of the display elements, the optical system of the display element, etc. In the following Examples, the measurements of these properties is performed under substantially the same conditions, and the characteristics of the liquid crystals themselves are determined.

TABLE 4

| | Nn liquid crystal (wt. %) | MR(°C.) |
|---|---|---|
| (I) | (66.6) + CH₃—O—⌬—COO—⌬—C₅H₁₁ (33.3) | −4–62 |
| (I) | (66.6) + CH₃—O—⌬—COO—⌬—O—C₆H₁₃ (33.3) | +10–70 |
| (I) | (66.6) + C₆H₁₃—⌬—COO—⌬—O—C₄H₉ (33.3) | +4–62.5 |
| (I) | (66.6) + CH₃—O—⌬—CH=N—⌬—C₄H₉ (33.3) | 0–60 |
| (II) | (66.6) + CH₃—O—⌬—CH=N—⌬—C₄H₉ (33.3) | −2–59 |
| (I) | (50) + C₇H₁₅—⌬—COS—⌬—C₅H₁₁ (50) | +2–62 |
| (II) | (50) + C₇H₁₅—⌬—COS—⌬—C₅H₁₁ (50) | −2–62 |
| (I) | (80) + C₅H₁₁—⌬—⌬—O—C₂H₅ (20) | 7–66 |
| (II) | (80) + C₅H₁₁—⌬—⌬—O—C₂H₅ (20) | 5–66 |
| (II) | (95) + C₃H₇—⌬—⌬—OOC—⌬—C₄H₉ (20) | 20–75 |
| (III) | (66.6) + CH₃—O—⌬—COO—⌬—C₅H₁₁ (33.3) | −3–70 |

(I), (II) and (III) correspond to the mixed liquid crystals shown in Table 2.

Many experiments have made it clear that the factors of the drive margin of a liquid crystalline material are firstly the temperature dependence ($\Delta T$) of $V_{th}$ and secondly the viewing angle dependence ($\Delta\phi$) of $V_{th}$. These factors are dominated by the properties of the liquid crystal, especially $\Delta\epsilon$ ($\epsilon_{\parallel}-\epsilon_{\perp}$, i.e. dielectric anisotropy), K (elasticity constant), and $\Delta n$ (refractive index anisotropy), and therefore have closely to do with the molecular structure of the liquid crystal.

The compatibility of the individual ingredients at the time of mixing is reflected on the MR of the resulting mixture. In particular, it is considered to be reflected on the crystal-nematic liquid crystal transition point (C-N point) of the resulting mixture. Accordingly, the MR value of each mixed liquid crystal is shown in the Examples as a measure for the compatibility, and for the thermodynamic stability of the mixture as a liquid crystalline material. The response characteristics, which are essential as display characteristics, have also been measured on each of the mixed liquid crystals, and tabulated.

Generally, the $V_{th}$ of a mixed liquid crystal consisting of an Nn-type liquid crystal and an Np-type substance decreases with increasing amount of the Np-type substance, but simultaneously, the drive margin M also tends to decrease. It is generally very difficult to find out liquid crystals capable of being driven at low voltages (for example, to make possible 3 V drive in a ⅓ bias-⅓ duty multiplexing drive system). It is generally thought that mass production of liquid crystal display devices is possible if the drive margin M is at least 6%, preferably at least 8%. In driving at lower voltages, the amount of the Np-type substance to be added should be increased. The increase of the amount of the Np-type substance, however, generally tends to cause a decrease in drive margin M, an increase in viscosity, or the aggravation of response. The discovery of an Np-type substance adaptable to an Nn-type liquid crystal is an important technical significance of this invention.

Np-type substances which are effective for reducing $V_{th}$ are nematic liquid crystals having large positive dielectric anistropy or homologs thereof (to be referred to as $N_p^s$-type substances), and examples of such $N_p^s$-type substances are those of formulae (63) to (71), (80), (81) and (83). The substances of formulae (63), (64) and (83) are especially preferred.

Examples 1 to 4 (Table 5) show specific examples using these $N_p^s$-type substances.

The $N_p^s$-type substance,

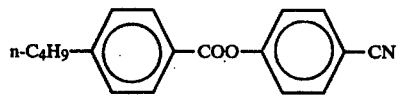

[formula (63)], is especially effective for reducing $V_{th}$.

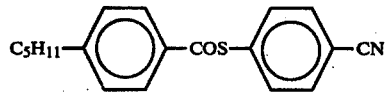

is a material having an especially large $\Delta\epsilon$ and a high N-I point (98° C.), and is effective for maintaining the N-I point of the mixed liquid crystal high (Examples 3 and 4).

Figure 11:
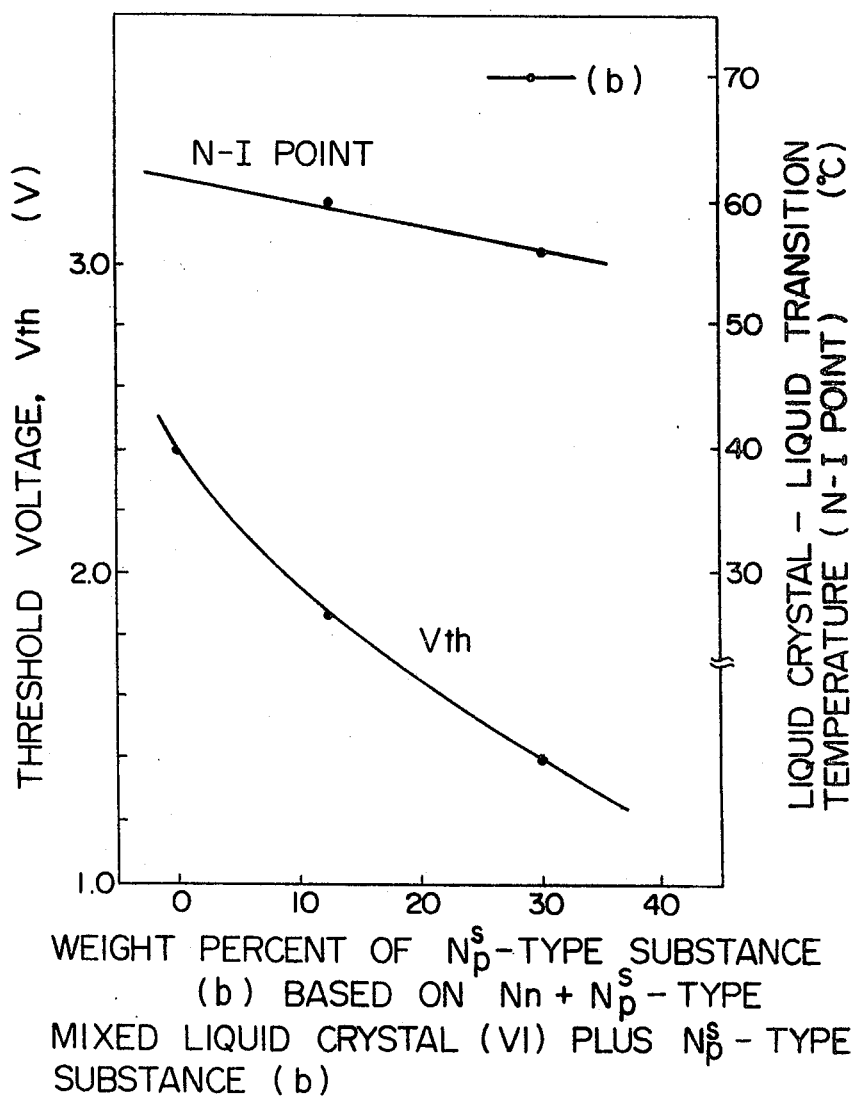

FIG. 11 shows the N-I point and $V_{th}$ of a mixture obtained by adding

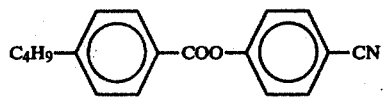

to be referred to as (b)] to an Nn+$N_p^s$ type mixed liquid crystal [to be referred to as (VI)] composed of

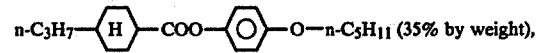

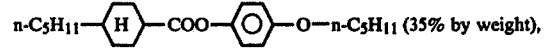

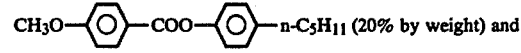

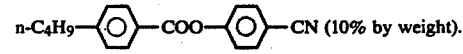

[(b) is abbreviated $N_p^s$-substances as will be described hereinbelow.]

Figure 12:
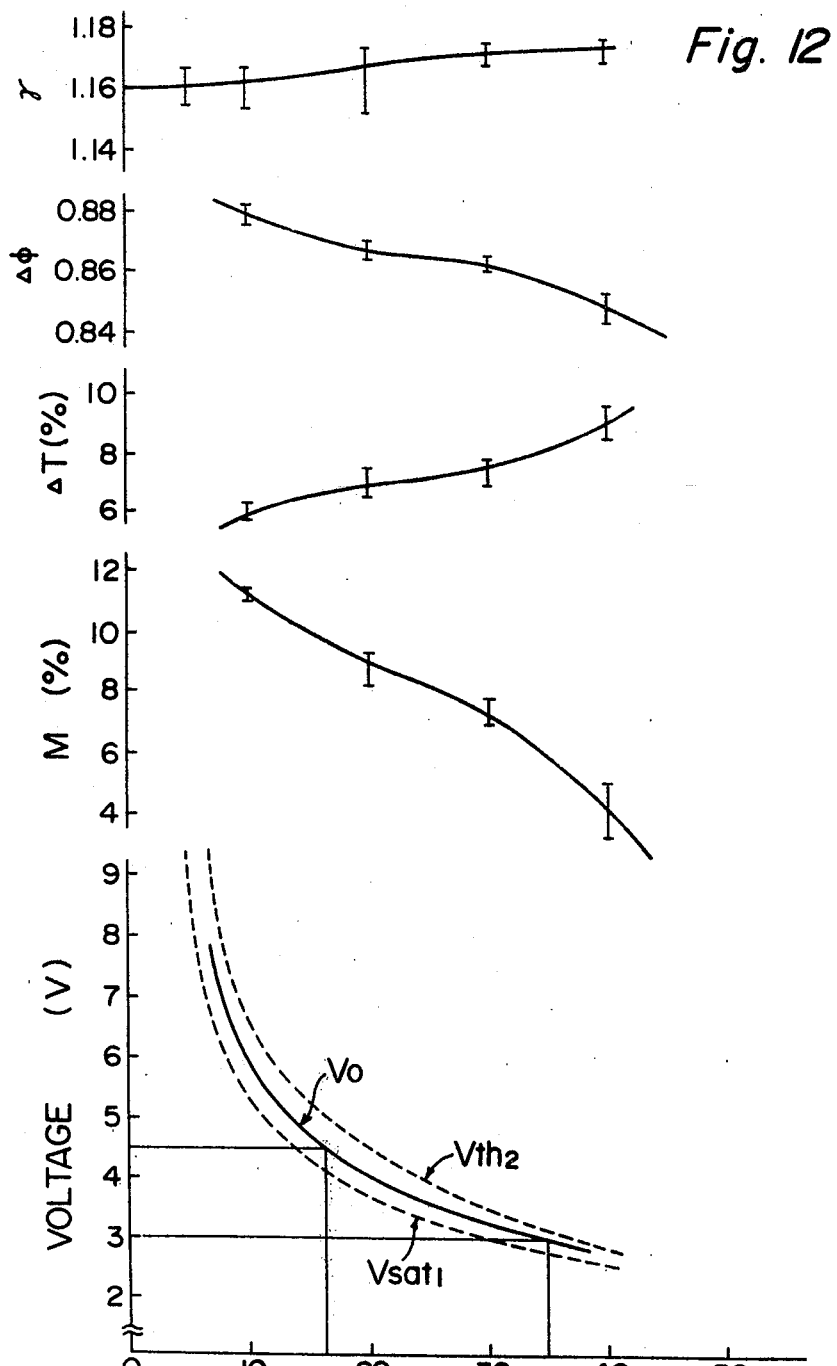

FIG. 12 shows the threshold voltage ($V_{th}$), and drive margin (M) of a mixture obtained by adding

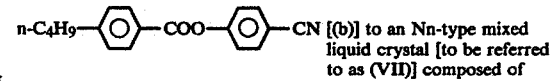

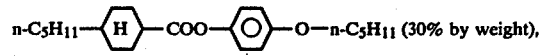

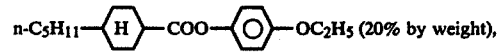

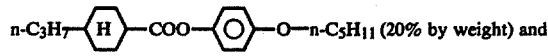

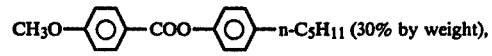

and the temperature dependence ($\Delta T$), viewing angle dependence ($\Delta\phi$) and sharpness ($\gamma$) of voltage-luminance characteristics of $V_{th}$.

As shown above, by adding 10 to 35% by weight, based on the resulting mixed liquid crystal, of an $N_p^s$ type substance to the matrix Nn-type liquid crystal of formula (18), a drive margin (M) of at least 6% can be obtained at a drive voltage ($V_o$, in a ⅓ bias-⅓ duty multiplexing drive system) of 4.5 V or below.

In the case of an Nn+$N_p^s$ type mixed liquid crystal structure, the increasing of the $N_p^s$ type substance causes a decrease in M or aggravates response characteristics.

The present inventors have also found that an Nn+$N_s^w$ type mixed liquid crystal obtained by adding a nematic liquid crystal having a relatively small positive dielectric anisotropy and/or its homolog (to be generically referred to as an $N_p^w$-type substance) to the matrix Nn-type liquid crystal of formula (18) is usable as a multiplexing drive liquid crystal having a relatively high $V_{th}$ value.

Examples of such $N_p^w$ substance are those of formulae (72) to (79) and (82). In particular, the biphenyl-type substances of formulae (72) to (74) are effective for improving response characteristics as shown in Examples 5 and 6. The present inventors have found that the substance of formula (75) is very useful as an $N_p^w$-type substance having an equally good response to the biphenyl-type substances and a larger drive margin.

Figure 13:
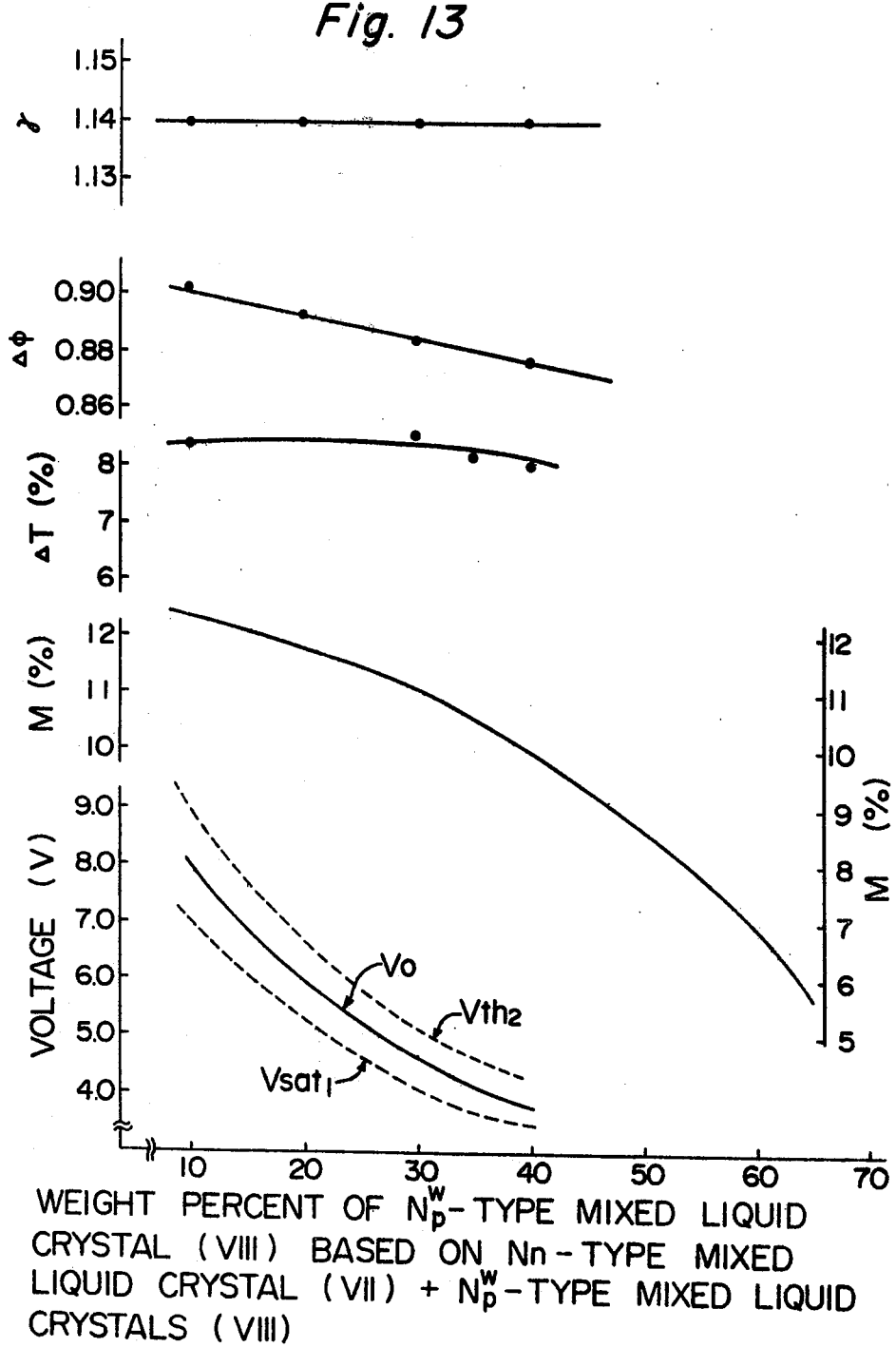

FIG. 13 shows the threshold voltage ($V_{th}$) of a mixture obtained by adding an $N_p^w$-type mixed liquid crystal [to be abbreviated (VIII)] composed of

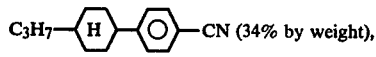
C₃H₇—⟨H⟩—⟨O⟩—CN (34% by weight),

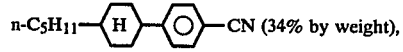
n-C₅H₁₁—⟨H⟩—⟨O⟩—CN (34% by weight),

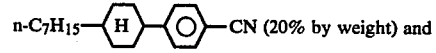
n-C₇H₁₅—⟨H⟩—⟨O⟩—CN (20% by weight) and

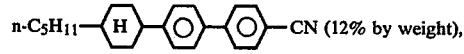
n-C₅H₁₁—⟨H⟩—⟨O⟩—⟨O⟩—CN (12% by weight), and the temperature dependence ($\Delta T$), viewing angle dependence ($\Delta\phi$) and sharpness ($\gamma$) of voltage luminance characteristics of $V_{th}$.

It is seen from FIG. 13 and Examples 7 to 10 that when the substance of formula (75) is added to a matrix composed mainly of the Nn-type substance of formula (18), the increasing amount of the substance of formula (75) gives better response characteristics. In addition, the drive margin (M) of this mixed liquid crystal is maintained at a high level of about 10 to 12%. It is assumed that the maintenance of this high drive margin is due to the fact that $\Delta\phi$ of the mixed liquid crystal is as high as 0.9 to 0.88 which is relatively close to 1.00. This suggests that the $Nn+N_p^w$ type mixed liquid crystal has optical properties [refractive index (n) and refractive index anisotropy ($\Delta n$)] which exert favorable effects on its electro-optical characteristics. It can be pointed out as another reason for the maintenance of a high drive margin that the $\Delta T$ value does not increase but is maintained at a substantially constant level of 8.0 to 8.6 even when the mixing ratio of the Np-type substance increases.

The effectiveness of the $N_p^w$ type substance of formula (75) for improved response characteristics is clearly seen from a comparison of Example 2 and Example 10 in which the central voltage is nearly equal. The liquid crystalline material of Example 2 also has better $\Delta T$ and $\Delta\phi$ than that of Example 10.

The amount of the $N_p^w$-type substance to be added to the Nn-type liquid crystal of formula (18) is preferably 10 to 40% by weight based on the total weight of the mixture. At this time, the central voltage is 4.5 V ($V_o$, ⅓ bias, ⅓ duty) or below, and the drive margin (M) is at least 6%.

Since the $N_p^s$-type substance in many cases has a high viscosity, the addition of this substance alone tends to increase the viscosity of the resulting mixed liquid crystal and thus to aggravate its response. On the other hand, since the $N_p^w$-type substance has a small dielectric anisotropy ($\Delta\epsilon$), its amount must be increased exceedingly when it is desired to reduce the $V_{th}$ of the mixed crystal by adding this substance alone to the matrix liquid crystal. A specific example is given in Example 13.

To avoid such a difficult problem, the present inventors have found a general method which comprises mixing an Nn-type liquid crystal with an $N_p^s$-type substance and such an $N_p$-type substance as will reduce the viscosity of the mixed liquid crystal, i.e. improve its response. This is specifically described below.

The most important mixed liquid crystals for practical application which have been found by the present invention are $(Nn+N_p^s+N_p^w)$ mixed liquid crystals composed of the Nn-type liquid crystal of formula (18), the $N_p^s$-type substance of formula (63) and the $N_p^w$-type substance of formula (75). For example, these mixed liquid crystals are shown in Examples 13 to 19.

Figure 14:
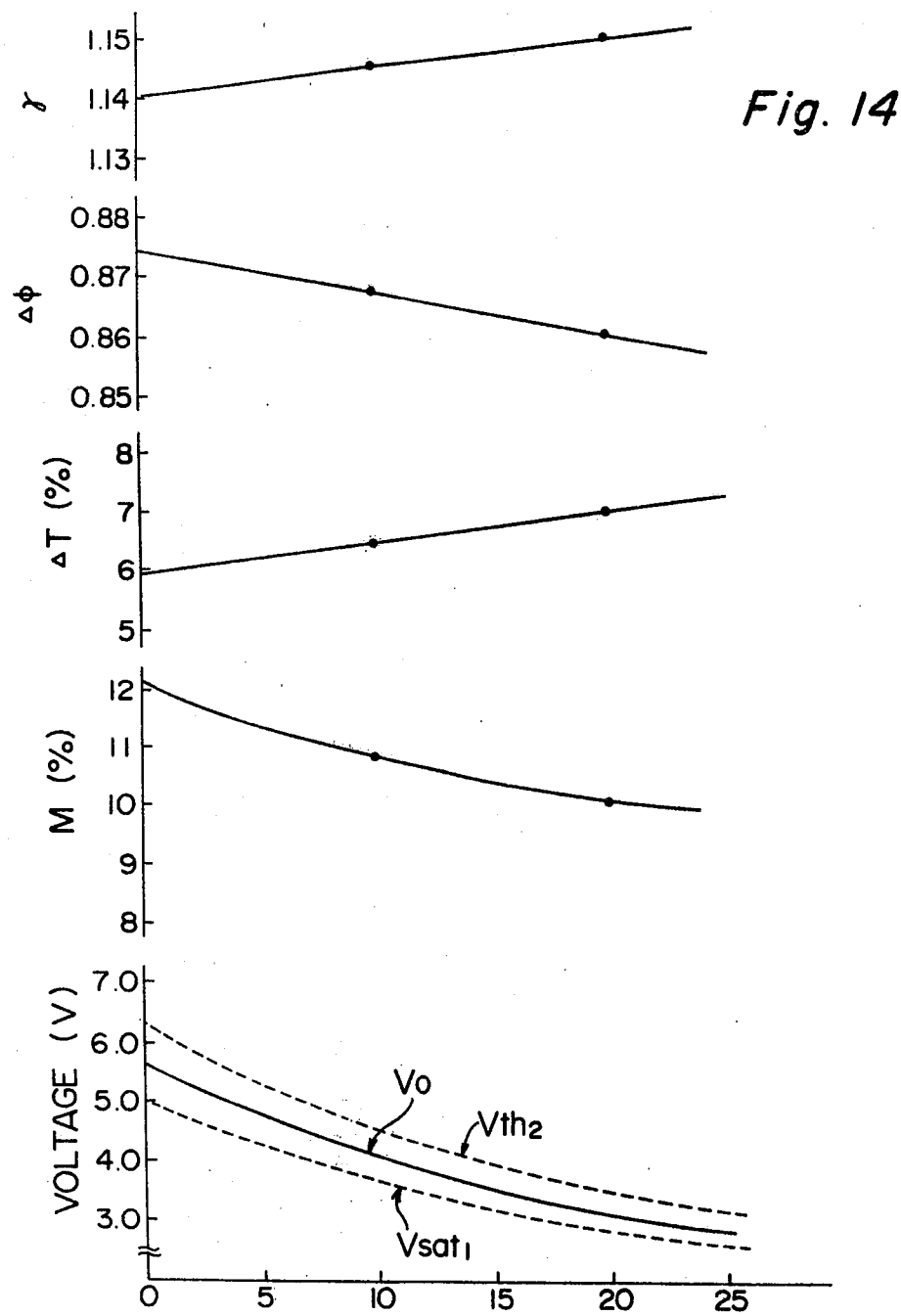

FIG. 14 shows a specific example of the $Nn+N_p^s+N_p^w$ type mixed liquid crystal. It is obtained by adding the $N_p^s$-type substance

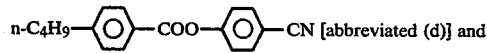
n-C₄H₉—⟨O⟩—COO—⟨O⟩—CN [abbreviated (d)] and

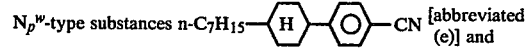
$N_p^w$-type substances n-C₇H₁₅—⟨H⟩—⟨O⟩—CN [abbreviated (e)] and

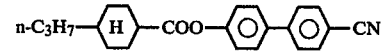
n-C₃H₇—⟨H⟩—COO—⟨O⟩—⟨O⟩—CN

[abbreviated (f)] to the Nn-type mixed liquid crystal (VII). FIG. 14 shows the threshold voltage $V_{th}$ ($V_o$, $V_{sat}$, $V_{th2}$), drive margin (M), $\Delta T$, $\Delta\phi$, and $\gamma$ of the mixed liquid crystal at varying mixing ratios of the Nn-type mixed liquid crystal (VII) and the $N_p^w$-type substance (f) while the amounts of the substances (e) and (f) are fixed at 20% by weight, and 10% by weight, respectively based on the total weight of the mixed liquid crystal.

As is clearly seen from the above example, when the $Nn+N_p^s+N_p^w$ type mixed liquid crystal in this invention consists of 10 to 30% by weight of the $N_p^s$-type substance, 10 to 60% by weight of the $N_p^w$-type substance and at least 30% by weight of the Nn-type liquid crystal (all percentages are based on the total amount of the mixed liquid crystal), a central voltage ($V_o$) of not more than 4.5 V and a drive margin (M) of at least 7 can be obtained. In other words, such a mixed liquid crystal is superior for multiplexing drive.

It has been shown hereinabove that the substance of formula (75) gives an especially favorable result. As another preferred $N_p^w$-type substance, the substance of formula (78) has been found. It is specifically illustrated in Examples 19 to 21 (Table 5).

Mixed crystals of the $Nn+N_p^s$ type, the $Nn+N_p^w$ type, and especially the $Nn+N_p^w+N_p^s$ type which constitute the heart of this invention have been described in detail hereinabove.

The present inventors further discovered the substances of formulae (77), (79) and (82) as auxiliary additives capable of having these mixed liquid crystals exhibit their characteristics more effectively.

The addition of small amounts of these auxiliary substances to the $Nn+N_p^s+N_p^w$ type mixed liquid crystal is very effective for maintaining the N-I point of the mixed liquid crystal and reducing $\Delta T$. This is specifically illustrated in Examples 13, 14 and 22.

TABLE 5

| Example | Mixed liquid crystals (the parenthesized Arabic figures show the amounts in weight percent, and the parenthesized Roman figures designate the liquid crystals) | Drive margin M (%) | Central voltage $V_o$ (V) | ΔT (%) | γ | Δφ | $t_r$ 25° C. (ms) | $t_f$ 25° C. (ms) | MR (°C.) |
|---|---|---|---|---|---|---|---|---|---|
| 1 | (IX) { n-C$_3$H$_7$—(H)—COO—(O)—O—n-C$_5$H$_{11}$ (33.3); n-C$_5$H$_{11}$—(H)—COO—(O)—O—n-C$_5$H$_{11}$ (33.3); CH$_3$O—(O)—COO—(O)—n-C$_5$H$_{11}$ (33.3) } (90) + n-C$_4$H$_9$—(O)—COO—(O)—CN (10) | 11.0 | 5.8 | 8.0 | 1.15 | 0.880 | 220 | 140 | −4–60 |
| 2 | (IX) (80) + n-C$_4$H$_9$—(O)—COO—(O)—CN (20) | 9.2 | 4.0 | 9.5 | 1.15 | 0.868 | 235 | 150 | −8–57 |
| 3 | (IX) (70) + n-C$_4$H$_9$—(O)—COO—(O)—CN (20) + n-C$_5$H$_{11}$—(O)—COS—(O)—CN (10) | 8.9 | 3.3 | 8.2 | 1.15 | 0.872 | 250 | 160 | −3–64 |
| 4 | (IX) (65) + n-C$_4$H$_9$—(O)—COO—(O)—CN (25) + n-C$_5$H$_{11}$—(O)—COS—(O)—CN (10) | 8.0 | 3.1 | 9.0 | 1.15 | 0.865 | 260 | 160 | −4–62 |
| 5 | (X) { n-C$_3$H$_7$—(H)—COO—(O)—O—n-C$_5$H$_{11}$ (50); n-C$_5$H$_{11}$—(H)—COO—(O)—O—n-C$_5$H$_{11}$ (50) } (90) + n-C$_5$H$_{11}$—(O)—(O)—CN (10) | 10.2 | 6.2 | 9.0 | 1.15 | 0.880 | 220 | 140 | 0–63 |
| 6 | (X) (80) + n-C$_5$H$_{11}$—(O)—(O)—CN (20) | 8.3 | 4.3 | 11.0 | 1.15 | 0.870 | 180 | 120 | −2–56 |
| 7 | (IX) (90) + (VIII) { n-C$_3$H$_7$—(H)—(O)—CN (34); n-C$_5$H$_{11}$—(H)—(O)—CN (34); n-C$_7$H$_{15}$—(H)—(O)—CN (20); n-C$_5$H$_{11}$—(H)—(O)—(O)—CN (12) } (10) | 12.4 | 8.0 | 8.4 | 1.14 | 0.902 | 230 | 120 | −6–64 |
| 8 | (IX) (80) + (VIII) (20) | 11.8 | 6.0 | 8.6 | 1.14 | 0.895 | 210 | 110 | −6–64 |
| 9 | (IX) (70) + (VIII) (30) | 11.0 | 4.6 | 8.2 | 1.14 | 0.885 | 190 | 100 | −5–65 |
| 10 | (IX) (60) + (VIII) (40) | 10.0 | 3.9 | 8.0 | 1.14 | 0.872 | 170 | 100 | −4–65 |

Drive condition, ⅓ bias, ⅓ duty

TABLE 5-continued

| Example | Mixed liquid crystals (the parenthesized Arabic figures show the amounts in weight percent, and the parenthesized Roman figures designate the liquid crystals) | Drive margin M (%) | Central voltage $V_o$ (V) | ΔT (%) | γ | Δφ | $t_r$ 25° C. (ms) | $t_f$ 25° C. (ms) | MR (°C.) |
|---|---|---|---|---|---|---|---|---|---|
| 11 | (VII) { n-C₃H₇—(H)—COO—(O)—O—n-C₅H₁₁ (20); n-C₅H₁₁—(H)—COO—(O)—O—n-C₅H₁₁ (30); n-C₅H₁₁—(H)—COO—(O)—O—C₂H₅ (20); CH₃O—(O)—COO—(O)—n-C₅H₁₁ (30) } (65) + n-C₄H₉—(O)—COO—(O)—CN (20) + n-C₇H₁₅—(O)—(O)—CN (10) + n-C₅H₁₁—(O)—(O)—(O)—CN (5) | 7.4 | 3.5 | 10.2 | 1.12 | 0.876 | 200 | 110 | −3–65 |
| 12 | (VII) (50) + n-C₄H₉—(O)—COO—(O)—CN (20) + n-C₅H₁₁—(H)—(O)—CN (30) | 7.3 | 2.8 | 9.9 | 1.15 | 0.870 | 220 | 140 | −4–52.5 |
| 13 | (VII) (45) + n-C₄H₉—(O)—COO—(O)—CN (20) + n-C₅H₁₁—(H)—(O)—CN (30) + n-C₇H₁₅—(H)—(O)—(O)—CN (5) | 7.6 | 2.9 | 8.7 | 1.16 | 0.853 | 230 | 140 | −2–58.3 |
| 14 | (VII) (40) + n-C₄H₉—(O)—COO—(O)—CN (20) + n-C₅H₁₁—(H)—COO—(O)—CN (30) + n-C₅H₁₁—(H)—(O)—(O)—CN (10) | 8.1 | 3.0 | 8.2 | 1.15 | 0.852 | 220 | 130 | −5–64.9 |
| 15 | (VII) (70) + n-C₄H₉—(O)—COO—(O)—CN (20) + n-C₇H₁₅—(H)—COO—(O)—CN (10) | 10.7 | 3.3 | 7.9 | 1.13 | 0.881 | 225 | 120 | −10–58 |
| 16 | (VII) (60) + n-C₄H₉—(O)—COO—(O)—CN (20) + n-C₇H₁₅—(H)—COO—(O)—CN (20) | 9.2 | 3.1 | 8.8 | 1.14 | 0.875 | 210 | 120 | −15–56 |

TABLE 5-continued

| Example | Mixed liquid crystals (the parenthesized Arabic figures show the amounts in weight percent, and the parenthesized Roman figures designate the liquid crystals) | Drive margin M (%) | Central voltage V₀ (V) | ΔT (%) | γ | Δφ | t_r 25°C. (ms) | t_f 25°C. (ms) | MR (°C.) |
|---|---|---|---|---|---|---|---|---|---|
| 17 | (VII) (50) + n-C₄H₉—⟨O⟩—COO—⟨O⟩—CN (20) + n-C₇H₁₅—⟨H⟩—COO—⟨O⟩—CN (30) | 6.5 | 2.8 | 9.9 | 1.15 | 0.864 | 206 | 120 | −15–55 |
| 18 | (VII) (55) + n-C₄H₉—⟨O⟩—COO—⟨O⟩—CN (20) + n-C₇H₁₅—⟨H⟩—⟨O⟩—CN (20) + n-C₅H₁₁—⟨H⟩—⟨O⟩—⟨O⟩—CN (5) | 9.8 | 3.2 | 8.5 | 1.15 | 0.874 | 210 | 120 | −10–68 |
| 19 | (XI) { n-C₃H₇—⟨H⟩—COO—⟨O⟩—O—n-C₅H₁₁ (33.3); n-C₅H₁₁—⟨H⟩—COO—⟨O⟩—CN (33.3); n-C₃H₇—⟨H⟩—COO—⟨O⟩—CN (33.3) } (80) + n-C₄H₉—⟨O⟩—COO—⟨O⟩—CN (20) | 8 | 3.0 | 8 | 1.15 | 0.85 | | | −20–62 |
| 20 | (XI) (70) + n-C₄H₉—⟨O⟩—COO—⟨O⟩—CN (30) | 6 | 2.8 | 9 | 1.15 | 0.84 | | | −22–60 |
| 21 | (XI) (90) + n-C₅H₁₁—⟨O⟩—COS—⟨O⟩—CN (10) | 9 | 3.5 | 8 | 1.15 | 0.87 | | | −12–72 |
| 22 | (VII) (50) + n-C₄H₉—⟨O⟩—COO—⟨O⟩—CN (20) + n-C₇H₁₅—⟨H⟩—COO—⟨O⟩—CN (20) + n-C₃H₇—⟨H⟩—COO—⟨O⟩—⟨O⟩—CN (10) | 10.0 | 3.2 | 7.0 | 1.15 | 0.860 | 210 | 130 | −5–72 |

TABLE 6

| | Mixed liquid crystals (wt. %) | Drive condition, ⅓ bias, ⅓ duty M (%) | V₀ (V) | Drive condition, ½ bias, ½ duty M (%) | V₀ (V) | ΔT (%) | γ | Δφ | t_r 25°C. (ms) | t_f 25°C. (ms) | Gap (μm) | MR (°C.) |
|---|---|---|---|---|---|---|---|---|---|---|---|---|
| Azoxy-type liquid crystal | { CH₃O—⟨O⟩—NON—⟨O⟩—C₂H₅ (33.3); CH₃O—⟨O⟩—NON—⟨O⟩—C₄H₉ (66.7) } (88) + C₄H₉—⟨O⟩—COO—⟨O⟩—CN (12) | 13 | 4.5 | 21 | 3.9 | 4 | 1.17 | 0.89 | 150 | 80 | 11 | −15–68 |

TABLE 6-continued

| Mixed liquid crystals (wt. %) | Drive condition, ⅓ bias, ⅓ duty M (%) | V₀ (V) | Drive condition, ⅓ bias, ⅓ duty M (%) | V₀ (V) | ΔT (%) | γ | Δφ | $t_r$ 25° C. (ms) | $t_f$ 25° C. (ms) | Gap (μm) | MR (°C.) |
|---|---|---|---|---|---|---|---|---|---|---|---|
| { CH₃O—⟨O⟩—NON—⟨O⟩—C₂H₅ (33.3); CH₃O—⟨O⟩—NON—⟨O⟩—C₄H₉ (66.7) } (75) + C₄H₉—⟨O⟩—COO—⟨O⟩—CN (25) | 11 | 3.1 | 19 | 2.7 | 6 | 1.17 | 0.89 | 170 | 100 | 11 | −15–68 |
| Biphenyl type liquid crystal C₅H₁₁—⟨O⟩—⟨O⟩—CN (24) + C₈H₁₇O—⟨O⟩—⟨O⟩—CN (10) + C₇H₁₅O—⟨O⟩—⟨O⟩—CN (51) + C₅H₁₁—⟨O⟩—⟨O⟩—⟨O⟩—CN (14) | 0 | 3.1 | 8 | 2.7 | 14 | 1.19 | 0.54 | 250 | 130 | 11 | −15–60 |
| C₇H₁₅—⟨O⟩—⟨O⟩—CN (45) + C₇H₁₅O—⟨O⟩—⟨O⟩—CN (15) + C₅H₁₁O—⟨O⟩—⟨O⟩—CN (20) + C₈H₁₇O—⟨O⟩—⟨O⟩—CN (20) | 1 | 3.3 | 9 | 2.9 | 12 | 1.20 | 0.55 | 250 | 160 | 11 | −10–62 |
| Ester-type liquid crystal C₄H₉—⟨O⟩—COO—⟨O⟩—CN (33.3) + C₅H₁₁—⟨O⟩—COO—⟨O⟩—CN (33.3) + C₇H₁₅—⟨O⟩—COO—⟨O⟩—CN (33.3) | 0 | 2.8 | 8 | 2.5 | 10 | 1.22 | 0.33 | 450 | 250 |  | −5–55 |
| Phenylcyclohexane-type liquid crystal C₃H₇—⟨H⟩—⟨O⟩—CN (33.3) + C₅H₁₁—⟨H⟩—⟨O⟩—CN (33.3) + C₄H₉—⟨H⟩—⟨O⟩—CN (33.3) | 2 | 3.0 | 10 | 3.0 | 10 | 1.17 | 0.83 | 120 | 80 |  | −5–51 |

It is seen from Table 6 that conventional azoxy-type liquid crystals can fully take a drive margin of at least 10%. However, as stated hereinabove, materials of this type have extremely low chemical stability to light and thus require a filter. Furthermore, they undesirably have a yellow color. On the other hand, nematic liquid crystals of the biphenyl type, ester type and phenylcyclohexane type are white, but have other defects. For example, the ester-type liquid crystals are suitable, in a sense, for driving at low voltages, but have a high viscosity and a slow response. Furthermore, as is clear from Table 6, they have a small drive margin, and are unsuitable for multiplexing drive. The biphenyl-type and phenylcyclohexane-type liquid crystals likewise have a small drive margin, and are unsuitable for multiplexing drive. In contrast, the liquid crystalline materials in accordance with this invention are white, and have a sufficiently large drive margin as is essential for multiplexing drive.

The present inventors also made extensive investigations and experiments on the alignment of the mixed liquid crystals of this invention so as to ascertain whether they have "good adaptability to an alignment control film" (the first requirement important for liquid crystalline materials as stated hereinabove). As a result, they have found that all of these mixed liquid crystals exhibit good alignment with regard to an obliquely vacuum-deposited film of SiO, a rubbed organic polymeric film, and a rubbed carbon layer.

Needless to say, it is useful in the utilization of the liquid crystalline composition of this invention to obtain favorable effects such as the prevention or removal of domain ascribable to rotation by further adding a suitable amount of a certain additive. Examples of such additional component are cholesteric liquid crystals typified by cholestyryl chloride and cholestyryl nonanoate and optically active substances such as l-menthol and 4'-(2"-methylbutyroxy)-4-cyano-biphenyl.

"Phase-transition type" compositions can be prepared by adding such an optically active substance in a greater amount.

The mixed liquid crystals in accordance with this invention can also be utilized for a color display effect referred to as "phase change with dye" by adding multicolor dyes. They are also useful as liquid crystal materials for a field effect mode utilizing changes in the birefringence of liquid crystals by an electric field.

As is clear from the foregoing description, the liquid crystals in accordance with this invention are white and thus desirable for display devices. Since they have strong resistance to light and are chemically stable, they are liquid crystal materials of high reliability. In addition, since these liquid crystals can take a broader drive margin than conventional white materials in multiplexing drive, they are best suited for use in liquid crystal display devices.

What we claim is:

1. In a multiplexed twisted nematic liquid crystal display device, the improvement comprising as said nematic liquid crystalline composition a mixture of
   A. at least one nematic liquid crystalline compound of the formula

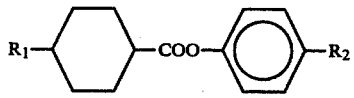

wherein $R_1$ represents $n\text{-}C_mH_{2m+1}$, $R_2$ represents $n\text{-}C_qH_{2q+1}\text{-}O$, and m and q each represent an integer of 1 to 10;
   and at least one of the following components B, C and D:
   B. at least one colorless, chemically stable nematic liquid crystalline compound having negative dielectric anisotropy of the general formula

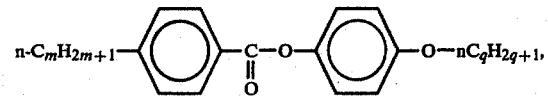
   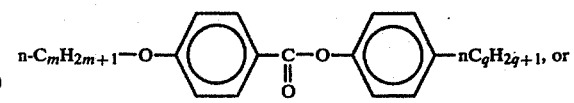
   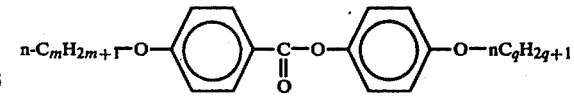

m and q each represent an integer of from 1 to 10, or a homolog thereof,
   C. at least one colorless, chemically stable nematic liquid crystalline compound having large positive dielectric anisotropy selected from the group consisting of compounds of the general formulas

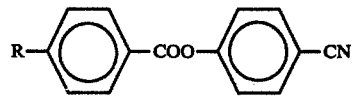

wherein R represents $n\text{-}C_mH_{2m+1}$ or $n\text{-}C_mH_{2m+1}\text{-}O$, and m represents an integer of 1 to 10; compounds of the general formula

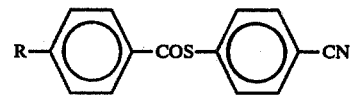

wherein R represents $n\text{-}C_mH_{2m+1}$, and m represents an integer of from 1 to 10, and compounds of the general formula

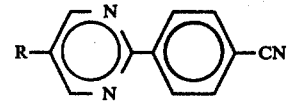

wherein R represents $n\text{-}C_mH_{2m+1}$, and m represents an integer of from 1 to 10, or homologs of said compounds; and
   D. at least one colorless, chemically stable nematic liquid crystalline compound having small positive dielectric anisotropy selected from the group consisting of compounds of the general formulas

wherein R represents $n\text{-}C_mH_{2m+1}$, $n\text{-}C_mH_{2m+1}\text{-}O$, or

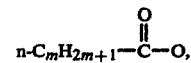

and m represents an integer of from 1 to 10, compounds of the general formula

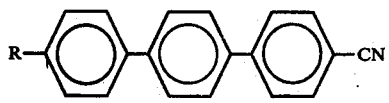

wherein R represents n-$C_mH_{2m+1}$, and m represents an integer of from 1 to 10, compounds of the general formula

wherein R represents n-$C_mH_{2m+1}$, and m represents an integer of from 1 to 10, compounds of the general formula

wherein R represents n-$C_mH_{2m+1}$, and m represents an integer from 1 to 8, compounds of the general formula

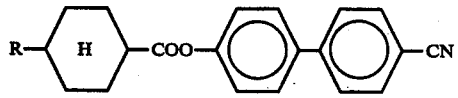

wherein R represents n-$C_mH_{2m+1}$, and m represents an integer of from 1 to 10, and compounds of the general formula

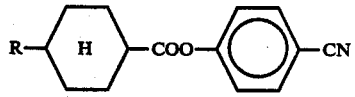

wherein R represents n-$C_mH_{2m+1}$, and m represents an integer of from 1 to 10, or homologs of said compounds; said mixtures comprising (1) about 43.3% to about 60% by weight of A, about 21.7% to about 30% by weight of B, and about 10% to about 35% by weight of C, (2) about 40% to about 90% by weight of A, 0% to about 30% by weight of B, and about 10% to about 40% by weight of D, or (3) about 23.3% to about 49% by weight of A, 0% to about 19.5% by weight of B, about 10% to about 30% by weight of C and about 10% to about 60% by weight of D.

2. The multiplexed twisted nematic liquid crystal display device according to claim 1, wherein said nematic liquid crystalline composition comprises the mixture (1).

3. The multiplexed twisted nematic liquid crystal display device according to claim 1, wherein said nematic liquid crystalline composition comprises the mixture (2).

4. The multiplexed twisted nematic liquid crystal display device according to claim 3 in which component B is present.

5. The multiplexed twisted nematic liquid crystal display device according to claim 3 in which component B is not present.

6. The multiplexed twisted nematic liquid crystal display device according to claim 1, wherein said nematic liquid crystalline composition comprises the mixture (3).

7. The multiplexed twisted nematic liquid crystal display device according to claim 6 in which component B is present.

8. The multiplexed twisted nematic liquid crystal display device according to claim 6 in which component B is not present.

9. The multiplexed twisted nematic liquid crystal display device according to claim 1 in which in the formula for component A, m is 3, 4, 5, or 6 and when m is 3, n is 1, 2, 3, 4, 5, or 9; when m is 4, n is 1, 2, 3, 4, 5, 6, or 8; when m is 5, n is 1, 2, 3, 4, 5, 6, or 7; and when m is 6, n is 5.

10. The multiplexed twisted nematic liquid crystal display device according to claim 9 wherein component A is a mixture of the nematic liquid crystalline compounds of the formula

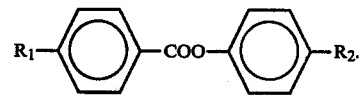

11. The multiplexed twisted nematic liquid crystal display device according to claim 1, wherein component C of said nematic liquid crystalline composition includes at least one compound of the formula

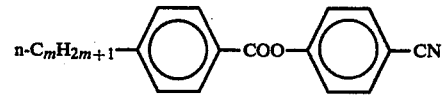

wherein m represents an integer of 1 to 10.

12. The multiplexed twisted nematic liquid crystal display device according to claim 1 or 11 wherein component D includes at least one compound selected from the group consisting of compounds of the formulas

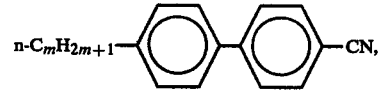

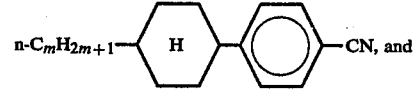

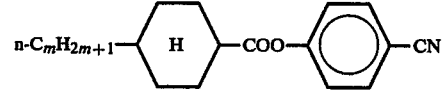

wherein m represents an integer of 1 to 10.

* * * * *

UNITED STATES PATENT AND TRADEMARK OFFICE
CERTIFICATE OF CORRECTION

PATENT NO. : 4,372,871
DATED : February 8, 1983
INVENTOR(S) : Kazuhisa TORIYAMA, Tamihito NAKAGOMI, et al.

It is certified that error appears in the above—identified patent and that said Letters Patent is hereby corrected as shown below:

In Claim 10, the formula should read:

Signed and Sealed this

Twenty-sixth Day of April 1983

[SEAL]

Attest:

GERALD J. MOSSINGHOFF

Attesting Officer

Commissioner of Patents and Trademarks